Nov. 19, 1935.　　　A. A. THOMAS　　　2,021,705

REMOTE CONTROL SYSTEM FOR RADIORECEIVERS

Filed Feb. 8, 1930　　　9 Sheets-Sheet 1

INVENTOR
Adolph A. Thomas

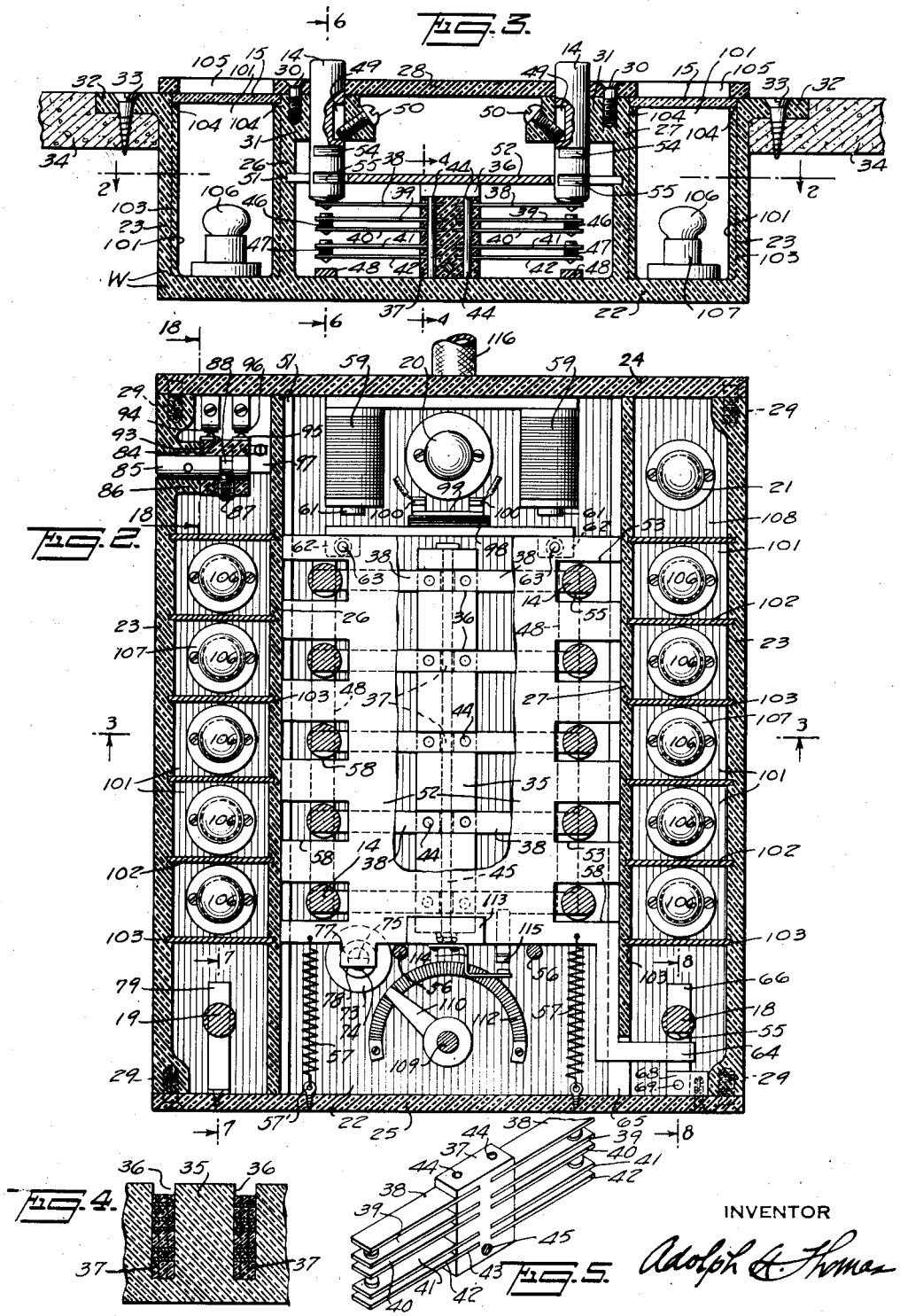

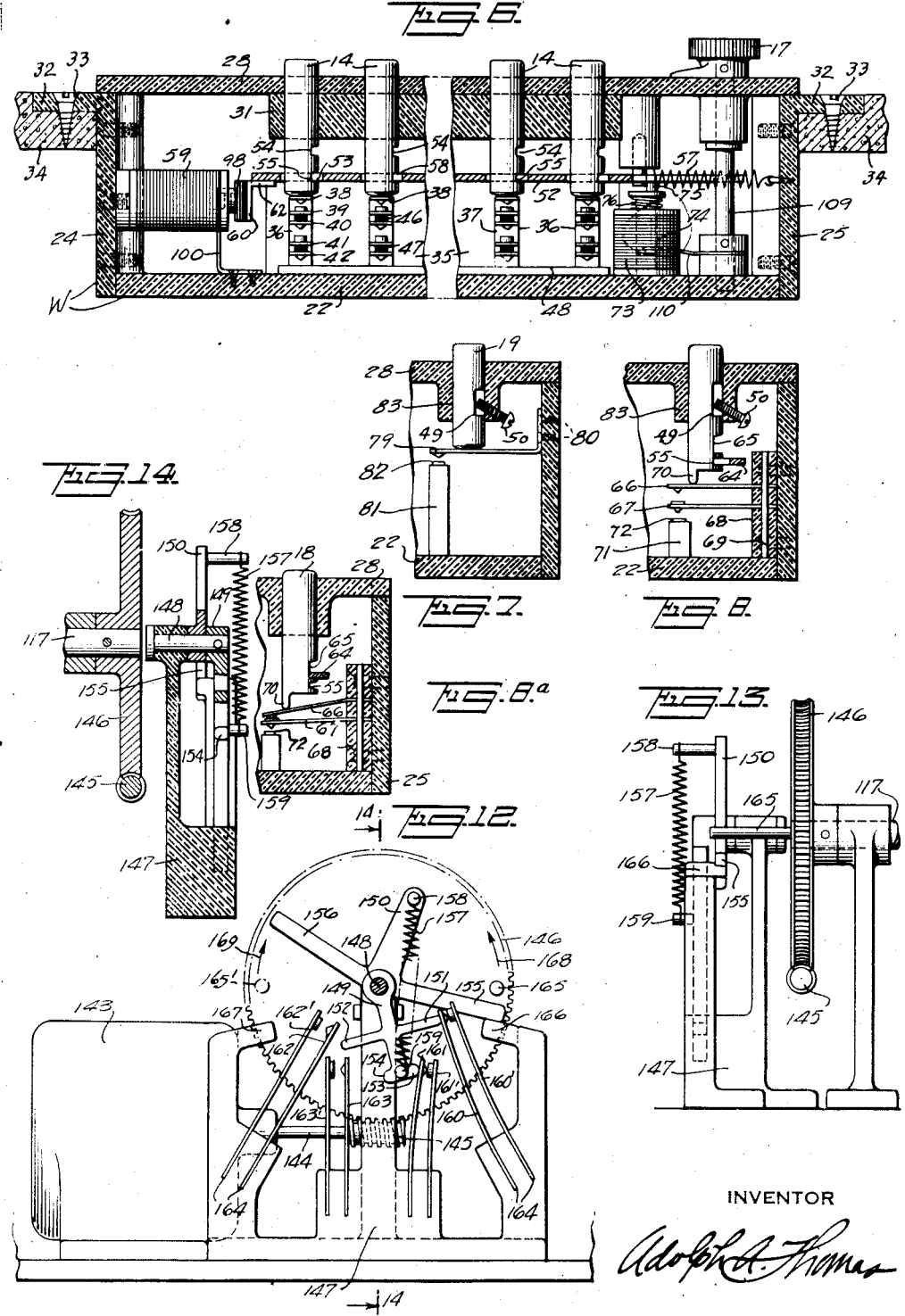

Nov. 19, 1935.  A. A. THOMAS  2,021,705
REMOTE CONTROL SYSTEM FOR RADIORECEIVERS
Filed Feb. 8, 1930   9 Sheets-Sheet 4
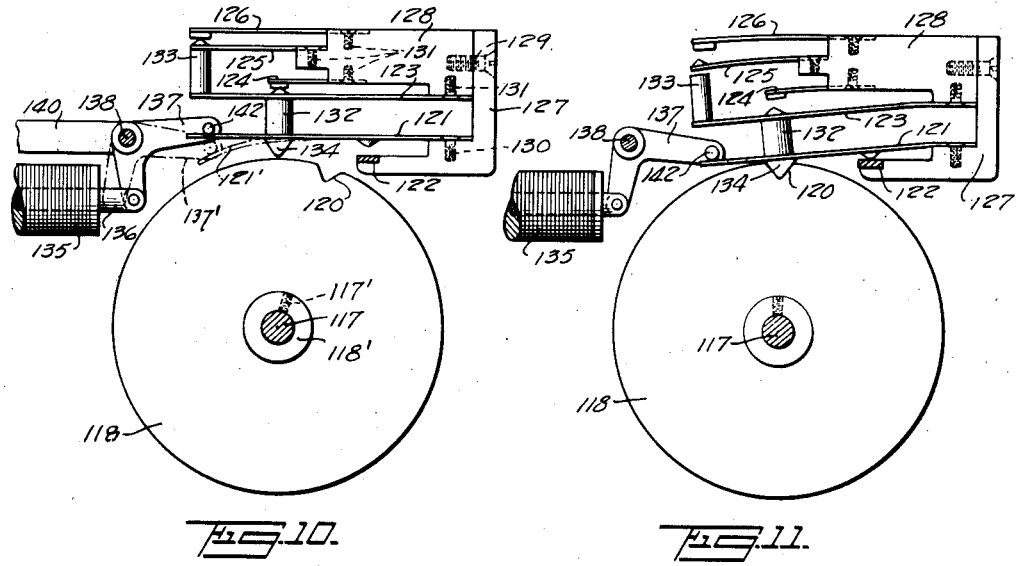
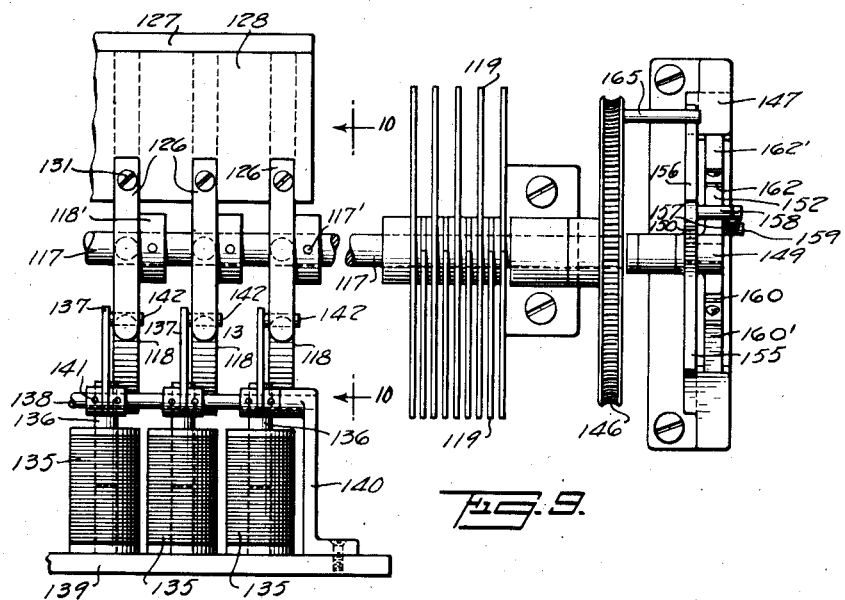
INVENTOR
Adolph A. Thomas

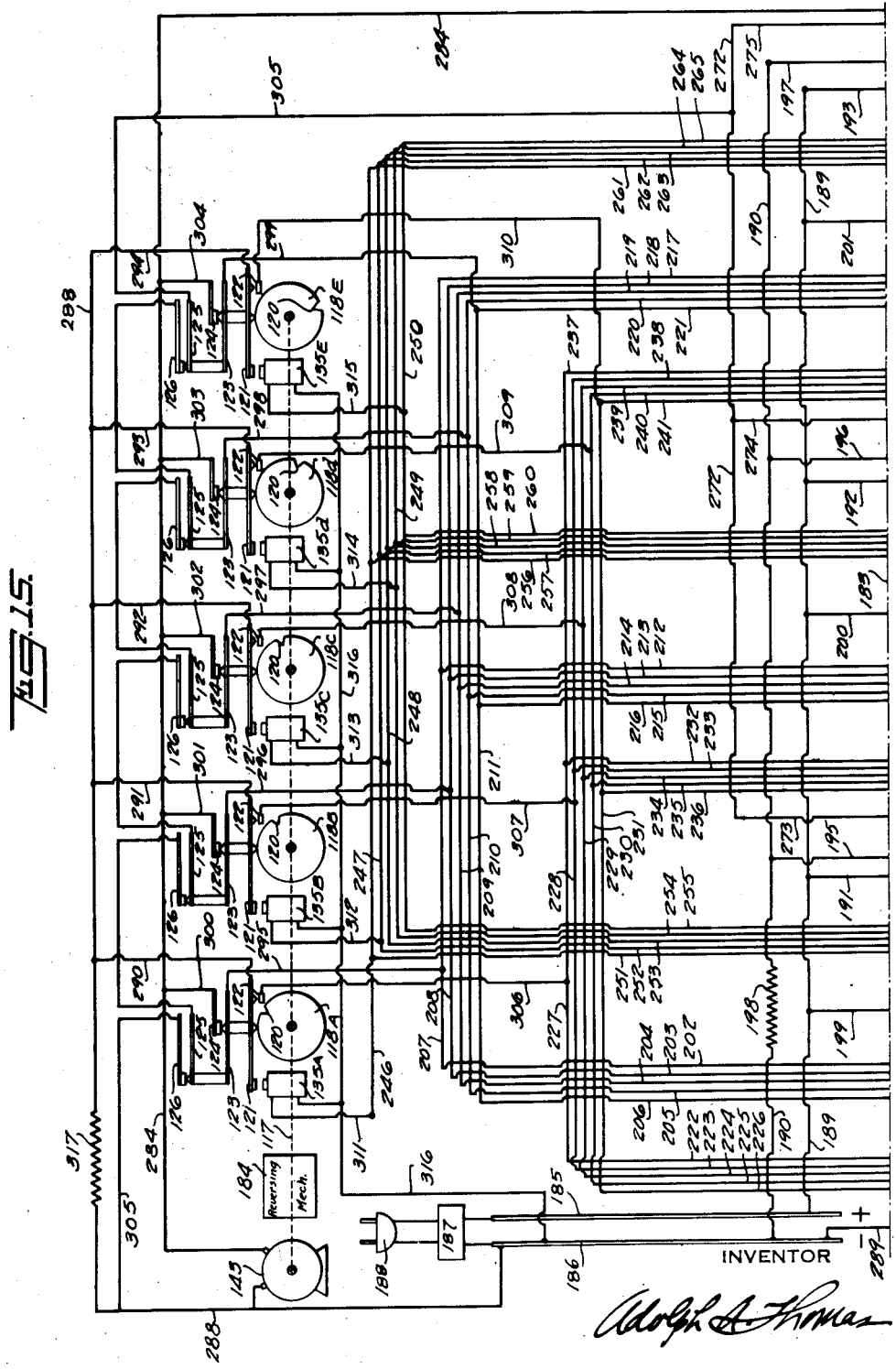

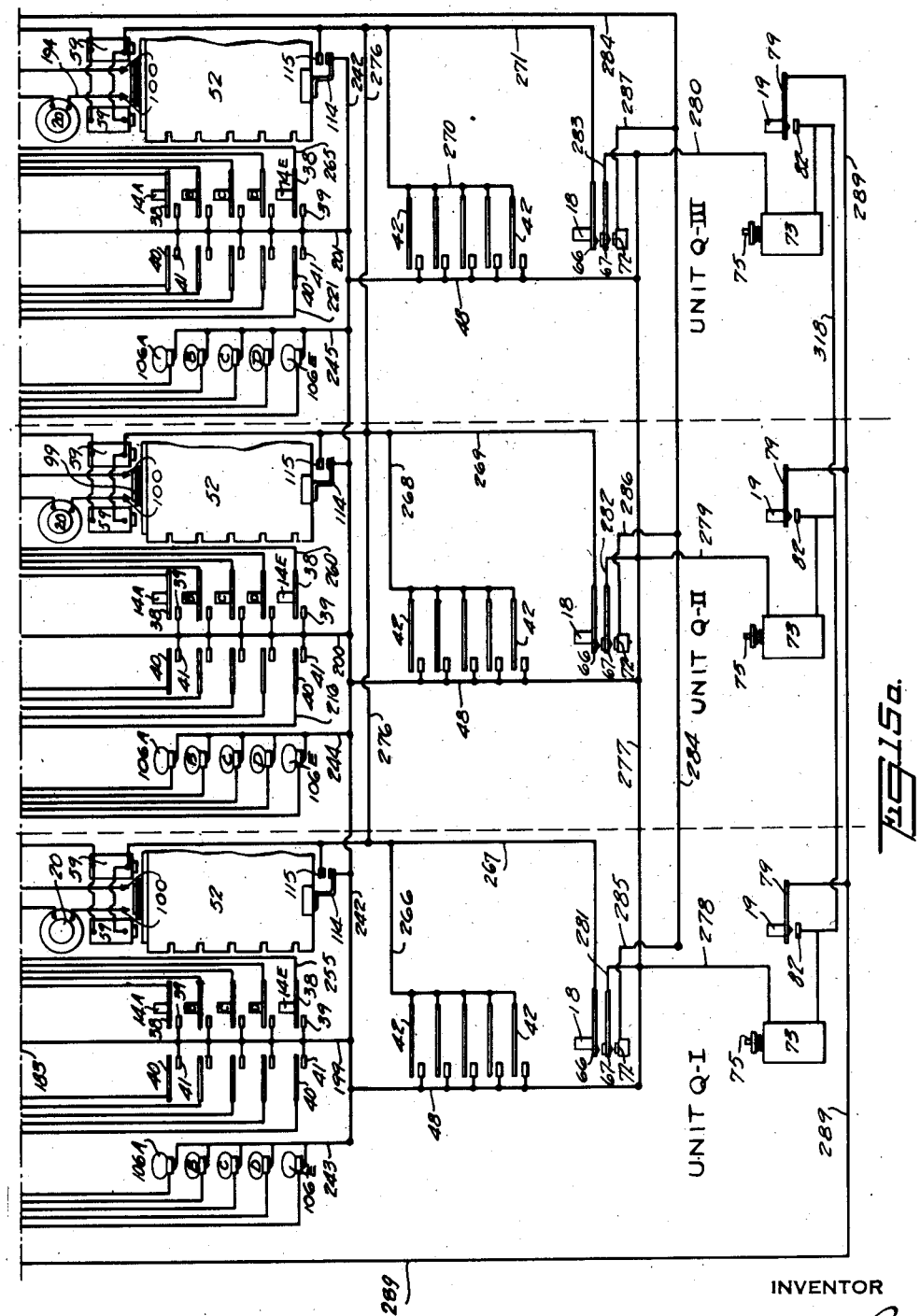

Nov. 19, 1935.  A. A. THOMAS  2,021,705
REMOTE CONTROL SYSTEM FOR RADIORECEIVERS
Filed Feb. 8, 1930  9 Sheets-Sheet 7
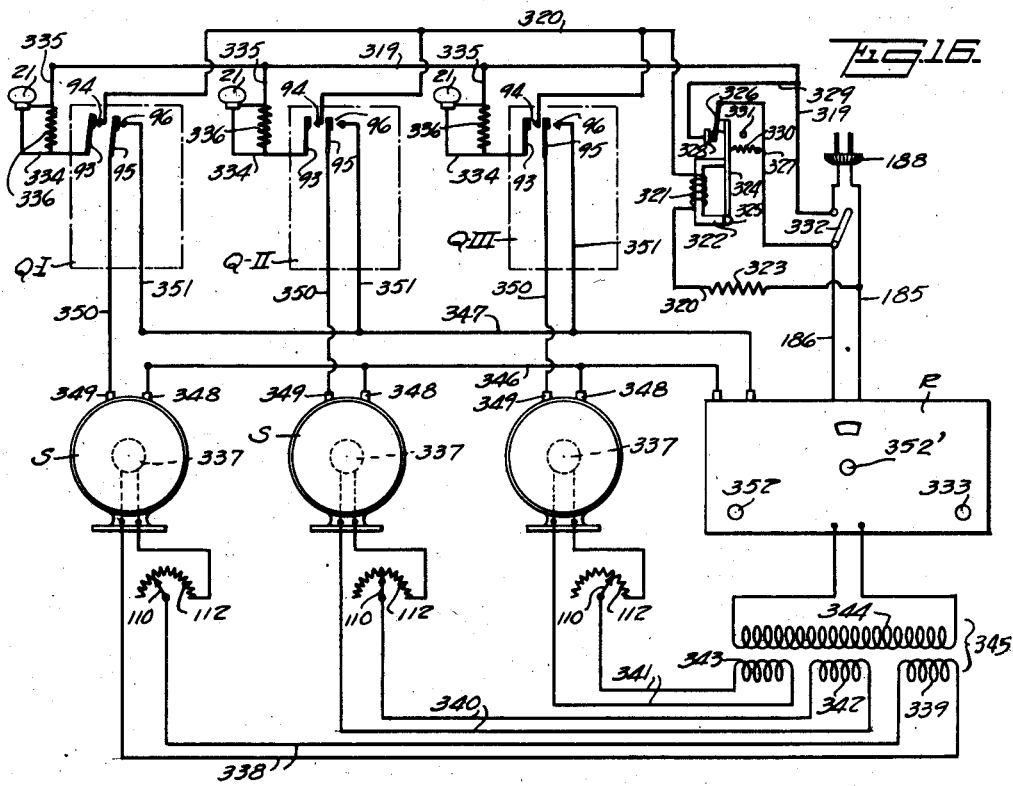
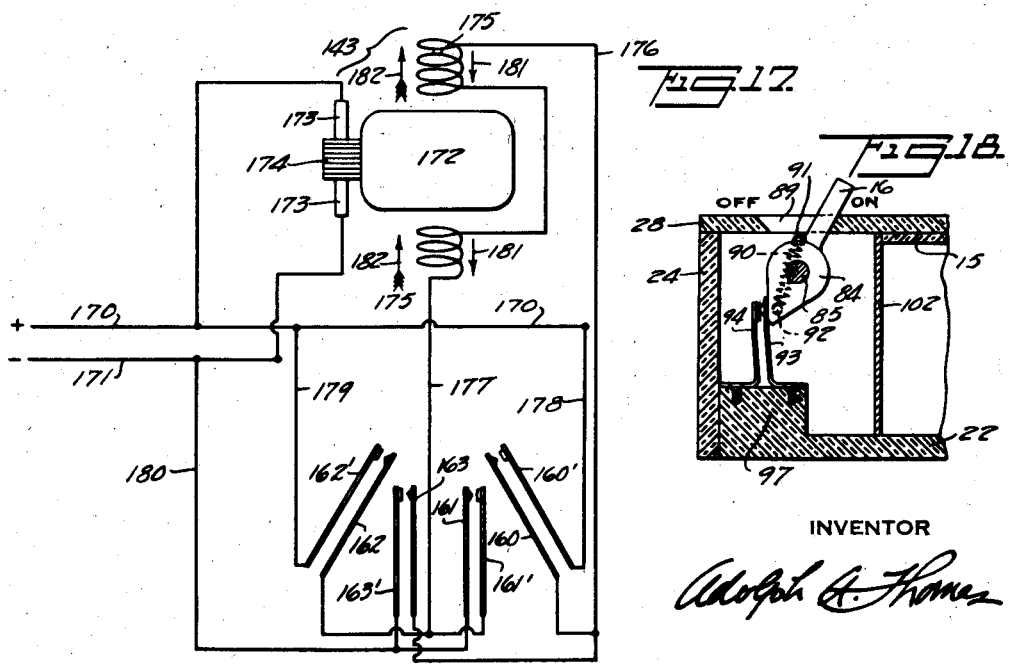
INVENTOR

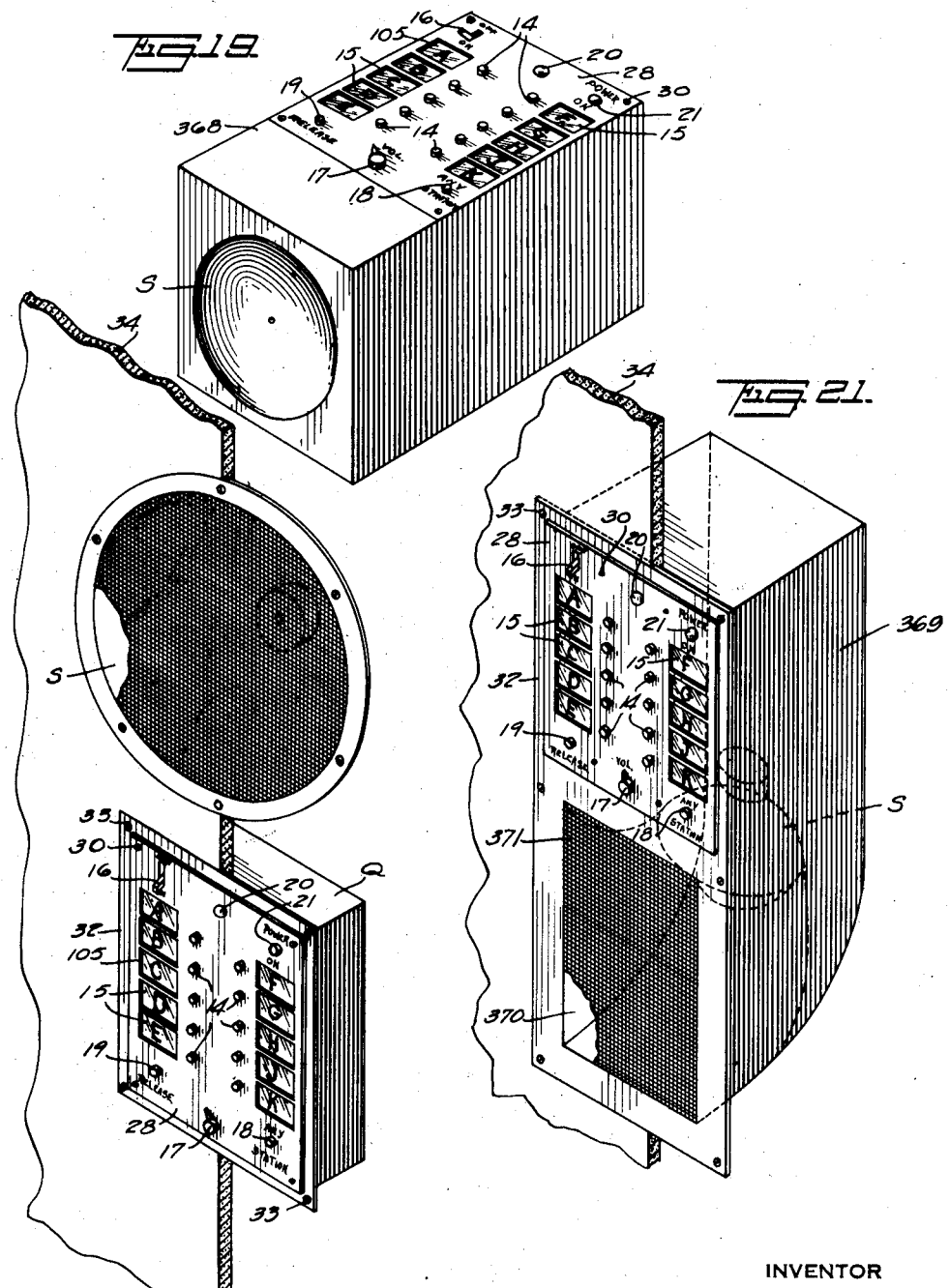

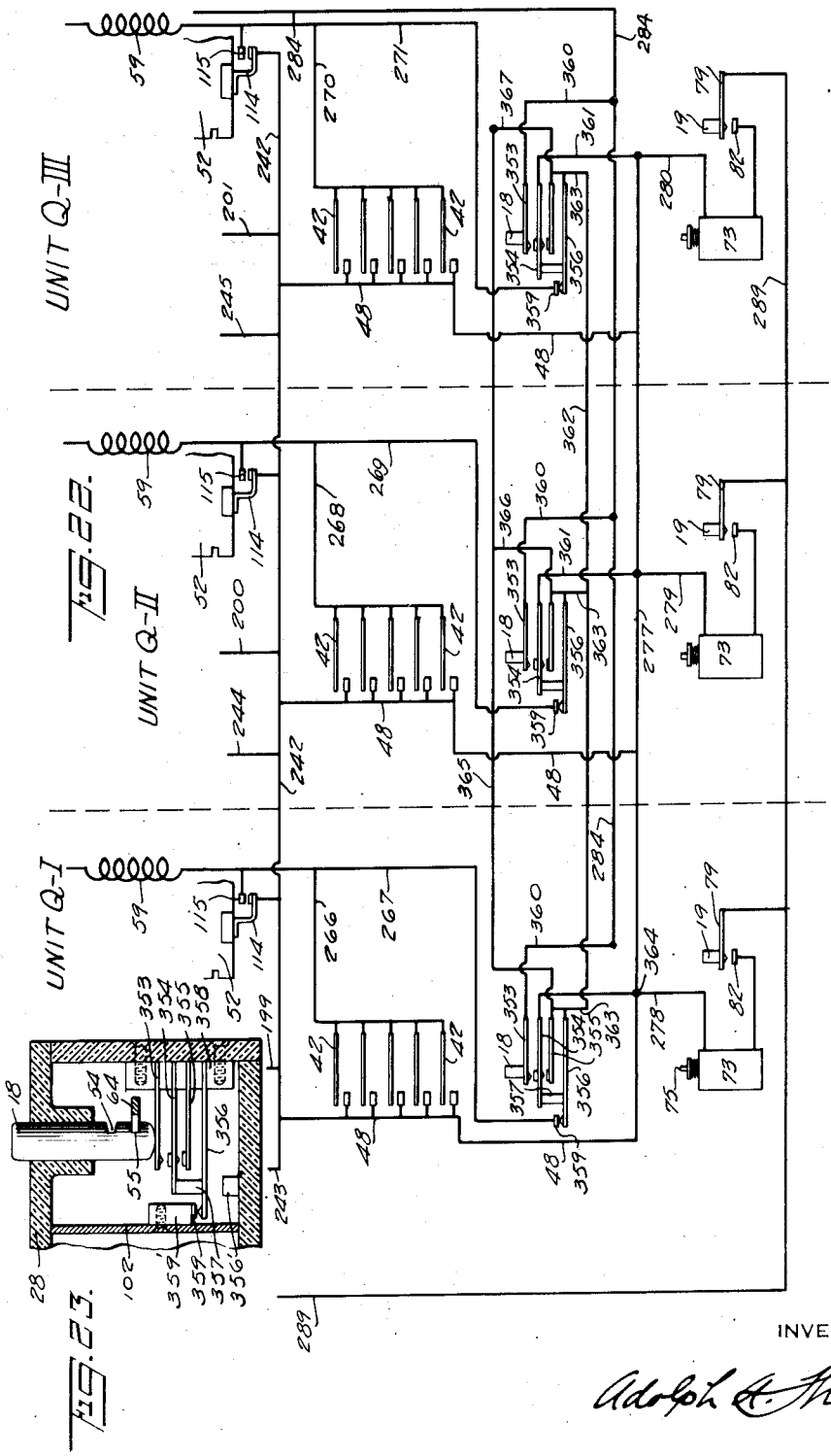

Patented Nov. 19, 1935

2,021,705

UNITED STATES PATENT OFFICE 2,021,705

REMOTE CONTROL SYSTEM FOR RADIORECEIVERS

Adolph A. Thomas, New York, N. Y.

Application February 8, 1930, Serial No. 426,794

22 Claims. (Cl. 250—20)

My invention relates to the art of controlling radio receivers from a distance, and its object is to provide an electric control system of novel construction and operation for tuning in any desired station from different rooms in a house. In accordance with this invention, a tuning box or panel is placed in each room where the receiver is to be operated, and each room has its own loudspeaker connected with the control box. These individual tuning devices may be in the form of a small portable box that can be put anywhere, or they may be built into the wall so that only the front plate or panel shows. Each control box has a set of tuning keys or push buttons representing certain selected stations, a volume knob for regulating the associated loudspeaker, and an on-off switch for the electric power supply.

The individual control units in my remote tuning system are connected not only with the radio receiver but with each other in such a way that the operation of any unit is automatically signalled to all the others. When a person pushes a button on his control box to bring in a certain station, a light flashes on all the control panels in the house as a signal that somebody is tuning the receiver. As soon as the desired station is in, a window identifying that station automatically lights on every control box. Whoever wants to hear that particular station need only close the main switch on his panel, and the loudspeaker in the room brings in the broadcast reception.

In a preferred embodiment of my invention, the station selecting switches in the control boxes are operated by keys or buttons which need only be pushed in for a moment. That is, after the operator presses the desired button as far as it will go, he can remove his finger and the button stays in. When a tuning button on any panel is pushed in, the buttons on all other panels are automatically locked against operation, including the unused buttons on the selecting panel. This assures the tuning of the receiver from any panel without interference by attempted operation of another control box. Each panel has a special key or button for releasing the tuning keys of all panels, so that the occupant of each room containing a panel has full control of the receiver. The release of the buttons is accompanied by the extinguishing of the signal light. In other words, when a person looks at his control panel and sees no light on it, he knows that nobody is using the radio receiver.

In the broad aspect of my invention, any practical mechanism may be employed to move the tuning shaft of the receiver to correct position when a remote control button is pushed in. One form of tuning mechanism devised by me comprises a series of disks mounted on the tuning shaft for controlling a set of switches, which in turn control the circuit of an electric motor connected to the shaft. The arrangement is such that, when a tuning button is pushed in, the particular disk representing the selected station automatically opens the motor circuit and stops the shaft in tuning position. To enable a person to go on a dialing expedition for any suitable program, I provide a separate button which holds the motor circuit closed as long as the button is pushed in. When the operator gets what he likes through the loudspeaker, he simply releases the button and the station remains in tune. The rotation of the tuning shaft in the receiver is automatically reversed at each end of the scale, so that a person using the remote control does not have to bother about which way the shaft will turn.

The various features of novelty and practical advantages of my multiple tuning system will be understood from a description of the accompanying drawings, in which—

Fig. 2 shows a sectional plan of the interior of a remote control box embodying certain features of my invention, this view being a section on line 2—2 of Fig. 3;

Fig. 3 represents a transverse section through the control box on line 3—3 of Fig. 2;

Fig. 4 is an enlarged fragmentary view on section line 4—4 of Fig. 3, to show the mounting of certain switch units in a common insulating base;

Fig. 5 is a detached perspective of one of the switch units operated by push buttons on the control box;

Fig. 6 shows a longitudinal section of the control box on line 6—6 of Fig. 3, except that the central portion of the box is broken away for lack of space;

Figure 1:
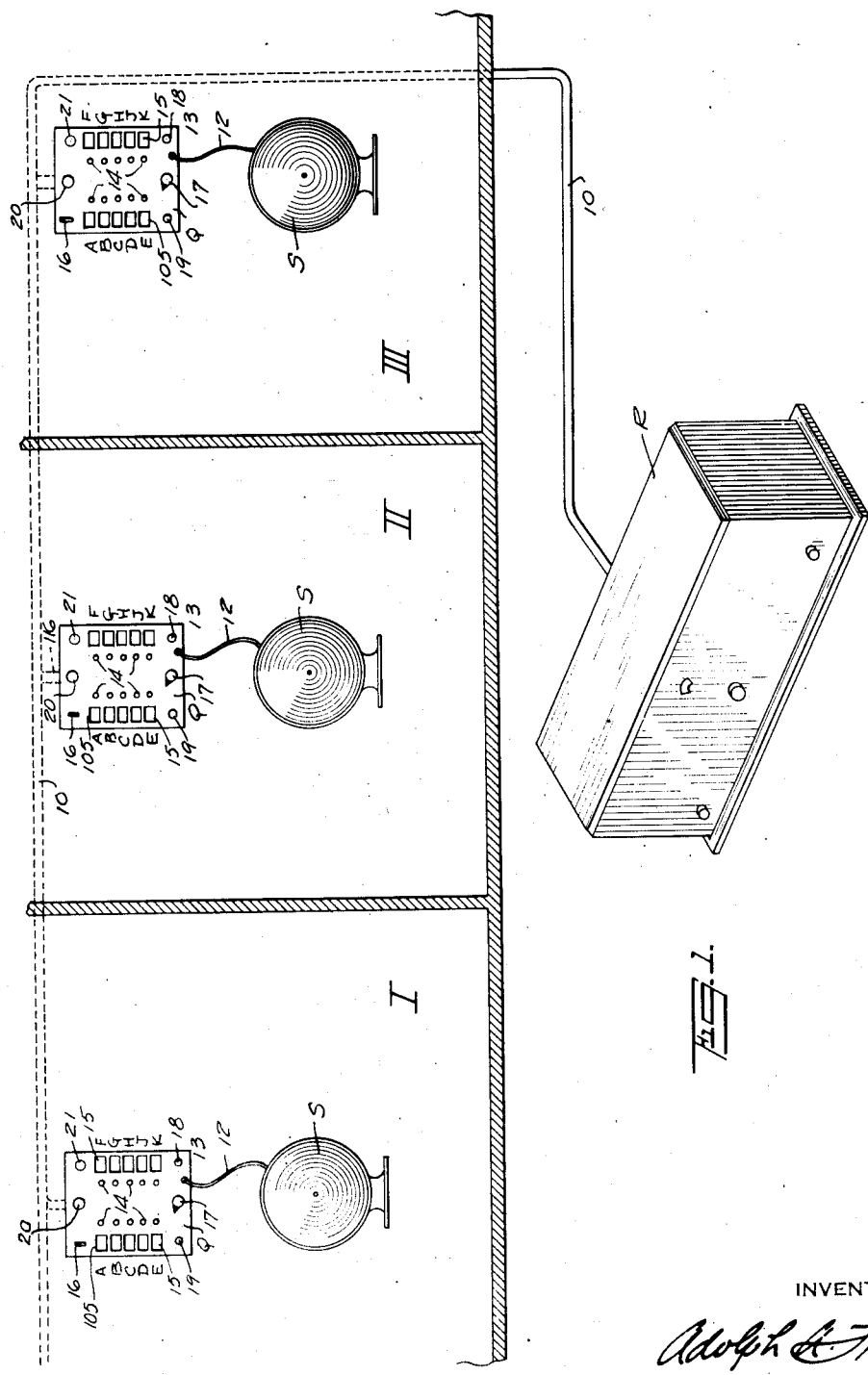
Fig. 1 illustrates diagrammatically a radio receiver operatively connected to several remote control panels located in different rooms in a house.

Figs. 7 and 8 are fragmentary detail views on lines 7—7 and 8—8 of Fig. 2, respectively, to show the switches controlled by the release key and by the special key that brings in any station, these switches being shown in normal open position;

Fig. 8a is like Fig. 8, with the key partly pushed in to close one of the associated switches;

Fig. 9 shows a plan view of the tuning shaft in the radio receiver and the associated control mechanism;

Fig. 10 is a side view on line 10—10 of Fig. 9, showing one of the control disks on the tuning shaft and the associated switches, the latter being in normal position;

Fig. 11 is like Fig. 10, but showing the condition of the switches when the associated disk is in tuning position for the selected station;

Figs. 12, 13, and 14 (on sheet 3) show various views of an automatic reversing switch for the electric motor that drives the tuning shaft, Fig. 14 being a section on line 14—14 of Fig. 12;

Figs. 15 and 15a together constitute a diagram of circuit connections between the radio receiver and the remote control units;

Fig. 16 is a circuit diagram of electrical connections between the radio receiver and the loudspeakers of the control units;

Fig. 17 is a diagram of circuit connections for the reversing switch shown in Figs. 12–14;

Fig. 18 represents an enlarged fragmentary view on section line 18—18 of Fig. 2 to show one form of main switch that may be used in each control box;

Fig. 19 shows a perspective of a control box or cabinet which also contains the loudspeaker;

Fig. 20 illustrates a control box and loudspeaker mounted separately in the wall of a room;

Fig. 21 shows a control box and loudspeaker mounted in the wall as a unitary structure;

Fig. 22 is a circuit diagram of a modified control system in relation to the universal tuning key; and Fig. 23 shows a form of mounting for the universal tuning key and associated switches employed in the system of Fig. 22.

I shall first describe the general operation of my multiple-unit remote-control system as diagrammatically represented in Fig. 1. A radio receiver R of suitable construction is operatively connected by an electric cable 10 to all the remote control units Q in the house. For the purpose of explanation, I have considered it sufficient to show three control units Q located in three rooms I, II and III, but any number of units may be employed. Each room also has a loudspeaker S operatively connected to the associated tuning device by conductors 12. If the loudspeaker S is of the table type adapted to be placed in any part of the room, the conductors 12 may be in the form of an electric cable adapted to be plugged into the front panel of the tuning device, as indicated at 13. The loudspeaker S connected with each tuning device may be of any approved type, structure and design. At the present time, the most popular loudspeaker is the moving coil type. Instead of using a loudspeaker separate from the control unit, I may combine the two into a unitary structure, as I shall explain later.

The remote control units Q may be constructed in the form of small boxes that can be placed in any convenient location in the room, or they may be built permanently into the wall as indicated in Fig. 1. The structural details of the control units Q will presently be described, and at this point I shall refer only to the general operation of these units. I have assumed that each unit is capable of tuning in ten selected stations, and so the front panel of each unit is provided with ten tuning keys or push buttons 14, which may conveniently be arranged in two rows of five each. The ten stations represented by these buttons are indicated in Fig. 1 by the reference letters A to K. Opposite each tuning key or button is a window 15 which may carry the call letters or other identifying marks of the particular station represented by the adjacent key. Each control panel also has an on-off switch 16, a volume control knob 17, a universal tuning key 18, a release key 19, and a pair of signal lamps 20 and 21. I might explain here that, in referring to the parts 14, 18, and 19 as keys or buttons, I use these terms in the broadest possible sense, both in the description and claims, to include any practical form and structure of movable finger piece for operating the necessary switches.

Let us suppose that the occupant of room I wants to tune in station C. All he has to do is to throw on the main switch 16 and then press the button opposite window C. The button need not be held in, but may be released after it has been pushed in as far as it will go. The depressed button remains locked in actuated position, and at the same time all the other tuning buttons on the panel are held against operation. When the main switch 16 is closed, the lamp 21 automatically lights to indicate that the power is on. This lamp may shine through a suitably colored lens— say, a bright green. When the tuning key for station C is pushed in, the lamp 20 automatically lights and it may shine through a differently colored lens, such as red. For convenience of description, I shall refer to the lamp 20 as the red signal and to lamp 21 as the green signal, without thereby intending any limitation as to colors. When the desired station is tuned in, the window C opposite the actuated key automatically lights and stays lighted as long as that particular station remains in tune. This enables the operator to observe at any time which station is sending the broadcast reception. To shut off the radio receiver, it is only necessary to open the main switch 16, which opens all circuits and extinguishes all lights on the control panel.

The key 18 is used when it is desired to tune in a station not represented by the automatic tuning buttons 14. The pressing of key 18 causes the tuning shaft of the receiver to turn slowly from one end of the dial to the other, and as each broadcasting station crosses its tuning position, the occupant of the room hears the program through the loudspeaker. When he gets the kind of program that he likes, he simply releases the key 18 and the station remains in tune. Since the key or button 18 enables the operator to go on a station-fishing or dialing expedition, as it were, I may appropriately call it the dialing key. The volume of the loudspeaker is controlled by turning the knob 17 one way or the other. By pressing the button 19, the operator unlocks all the tuning keys and releases the key that was previously actuated.

When any control unit Q is operated, that fact is automatically signalled to all the other units in the house. For example, when the occupant of room I presses any one of the tuning buttons 14 and 18, the red signal 20 instantly lights on all panels. This warns everybody that someone in the house is operating his remote control. Let us assume that the occupant of room I has pressed the button 14 for station C. As soon as that station is in tune, the corresponding windows in all control panels are automatically lighted, so that the occupants of the different rooms can tell which station has been tuned in by simply looking at their respective panels. If, let us say, a person in room III feels like getting the broadcast of station C that was tuned in from some other room, he simply closes the main switch 16, whereupon the associated loudspeaker 8 is automatically connected with the radio receiver.

I have said that, when a tuning key 14 on any panel is operated, all the other tuning keys on that panel are locked against manipulation. This automatic locking of the keys extends to all the other control panels. Consequently, when the occupant of a room sees the red signal 20 flash up, he is not only warned that somebody in the house is tuning the radio receiver, but he is actually prevented from operating his own tuning keys, so as not to interfere with the tuning of the receiver. It is, of course, necessary to release the locked keys before they can be used to tune in a station, and I prefer to control this releasing operation from each panel. Suppose the occupant of room II, after getting the red warning signal 20, finds that he gets no reception through the loudspeaker on closing the main switch 16; this may mean that the station originally tuned in by somebody else has gone off the air. If the occupant of room II now tries to bring in his own station, he finds that the buttons 14 and 18 are locked. He therefore presses key 19 which instantly releases all the tuning keys on his panel, so that he can bring in any station he wants. Although the releasing key 19 on each panel gives the occupant of each room the power to place his control device in operative condition, even if somebody else has already tuned the receiver, it is to be expected that the members of a household will respect each other's tuning rights when the red signals 20 flash on.

The main purpose of locking the control panels when a tuning button on any panel is pushed in, is to prevent the accidental or unintentional operation of a second panel. For instance, a child in the room might be attracted to the panel when the red light 20 goes on and try to push one of the tuning buttons. Or, it might happen that the red signal lamp 20 had burned out, so that the persons in the room would not be informed of the radio set being tuned from some other panel. The inoperative condition of a signal lamp will not affect the automatic locking of the tuning keys on all panels by the operation of any key on any panel. In other words, when a person pushes in a key, he is assured that his tuning operation will not be disturbed in another room. Figs. 2-8a and Fig. 18 show the construction of a tuning unit Q, and since these are supposed to be duplicates of each other, a detailed description of one unit includes them all. The operative parts of each control unit are housed in a suitable box or casing indicated as a whole by W and comprising a bottom or base plate 22, sides 23, top and bottom pieces 24 and 25, a pair of inside partitions 26 and 27, and a removable cover 28. The parts 22, 23, 26, and 27 may be cast or molded as a single piece of insulating material, such as bakelite, fiber, porcelain and the like. The end members 24 and 25 in some instances may be formed integral with the body of the box, but it is usually better to make them separate so that they can be removably attached to the sides 23 by screws 29 or otherwise (see Fig. 2). This facilitates assembling of the inside mechanism, as will presently be better understood. The cover 28, which is of suitable color and design, is removably fastened to the box by screws 30, which in this instance enter the lateral extensions or shelves 31 projecting inwardly from the longitudinal partitions 26 and 27, as best shown in Fig. 3. The shelves 31 may be formed integral with the partitions from which they project. If the box W is to be mounted in the wall of a room, the sides 23 are provided with lateral flanges 32 adapted to receive screws or other fastening members 33 which enter the supporting wall 34. If desired, the top and bottom pieces 24 and 25 of the box may also have securing flanges 32, as shown in Fig. 6, although that is not absolutely necessary. Any other practical means may be employed for properly mounting the remote control boxes permanently in the walls of the different rooms. If these boxes are intended to be portable, the flanges 32 are not necessary, and the box will be so designed that it can be placed anywhere in the room for convenient operation.

In the center of box W is a block 35, which may conveniently be formed integral with the bottom plate 22. The block 35 has a series of cross-slots 36 equi-distantly spaced. In the present embodiment of my invention there are five slots 36, because it has been assumed that the tuning keys 14 are arranged in two rows of five each, and the slots 36 are in lateral alignment with the keys, as will be clear from Fig. 2. In each slot 36 of block 35 is mounted a rectangular insulating piece 37 which carries two sets of five switch arms marked 38, 39, 40, 41, and 42. These switch arms may be in the form of flat spring blades of good conducting metal and are fitted at their inner ends in slots 43 in the supporting piece 37. An insulating pin 44 or the like may be used to secure each set of switch blades in position. A longitudinal rod or bolt 45 passing through block 35 holds the insulating pieces 37 firmly in slots 36. Any other practical mounting of the switch members 38—42 may be used, but the construction just described has the advantage of easy assembly. In the first place, the individual switch arms are mounted on the flat pieces 37 and the latter are then inserted into slots 36 in a tight fit. The rod or bolt 45 is then passed through block 35 and members 37, whereby all the switches are properly and securely positioned. As best shown in Figs. 3 and 6, the switch arms 39 and 40 are connected by an insulating stud or washer 46, which may be attached to either of those arms, and a similar stud 47 connects the switch arms 41 and 42. The bottom plate 22 of the control box carries a pair of contact bars 48 arranged in alignment with the free ends of switch arms 42, as best shown in Fig. 3.

The automatic tuning keys or buttons 14 are slidably mounted in the lateral extensions or shelves 31 of partitions 26 and 27. A simple way to hold the keys in place is by means of axial slots 49 and screws 50, as illustrated in Fig. 3. The screws 50 are removably mounted in shelves 31 and extend at their free ends into the key slots 49. This simple arrangement permits the necessary axial movement of the keys and yet locks the same against turning. The set-screws 50 are arranged at such an angle that they are easily inserted or withdrawn by an ordinary screw-driver. The keys or push buttons 14 are preferably cast or molded of suitable insulating material such as bakelite, porcelain, celluloid, fiber, and the like. The inner end of each key rests against the free end of the associated spring arm 38, which normally holds the key in raised or projected position. It is clear from Fig. 3 that, when a key 14 is pushed in as far as it will go, the switch members 38 and 39 are closed first, then the switch members 40 and 41 are closed, and finally the switch member 42 is moved against the adjacent contact bar 48. Of course, when a key is pushed in by a quick movement, as is usually done, the closing of the three switches 38—39, 40—41 and 42—48 takes place almost simultaneously. When an actuated key is released, the five spring arms 38 to 42 instantly snap back to normal open position, and the upper switch arm 38 pushes the key out until the inner end of slot 49 strikes the projecting end of screw 50. The inward movement of each key is limited by the lower switch arm 42 engaging the fixed contact bar 48. The switch arms 38—42 may be made of spring brass, bronze, or the like, and have just enough resiliency to offer the right amount of resistance to the movement of key 14.

The inner partitions 26 and 27 of box W are provided with a pair of aligned slots 51 for slidably supporting a key-locking plate 52, which may be stamped from a sheet aluminum, bakelite, fiber, or other suitable material. The plate or slide 52 is formed with slots or recesses 53 arranged in line with the tuning keys 14, as shown in Figs. 2, 3, and 6. Each key 14 has a pair of transverse grooves or slots 54 and 55. When the keys are in normal position, the slots 55 are in line with slide 52, as may be seen in Figs. 3 and 6. The locking plate 52 is normally held against a fixed stop or stops 56 by one or more contracting coil springs 57, which are attached at one end to the wall 25 of the box by screw-eyes 57' or otherwise. The stops 56 may be a pair of posts or studs projecting from the bottom of the box. In the normal position of slide 52 any one of the tuning keys 14 is free to be pushed in, because the edges of recesses 53 are out of contact with the keys, as will be clear from Figs. 2 and 6. When the plate 52 is moved slightly toward the end piece 24 of the box (toward the left as viewed in Fig. 6), the edges 58 of recesses 53 move into locking engagement with one of the slots 54 and 55 of each key 14. Those keys that are in normal position are locked by the edges 58 entering the slots 55. When a key is pushed in, the adjacent edge 58 of plate 52 enters slot 54 and thereby locks the key in depressed position. In other words, when the slide 52 is moved out of normal position, the tuning keys 14 are locked against operation and the key which was actuated is locked against return movement. Since the keys 14 can not turn in the supporting shelves 41 on account of the slot and screw connection 49—50, the cross-slots 54 and 55 are always in operative relation to slide 52.

The slidable key-locking plate 52 is actuated by an electromagnet comprising one or more coils 59 and an armature bar 60. The coils 59 are mounted on a suitable magnetic frame which terminates in pole pieces 61 arranged at opposite ends of armature bar 60, and this frame may be attached to the adjacent end 24 of the control box. The armature bar 60 is secured to one end of slide 52 in any practical way. In Figs. 2 and 6 I have shown the armature provided with a pair of lateral lugs 62 for receiving bolts or rivets 63. When the coils 59 are energized, the armature bar 60 is drawn to the pole pieces 61 and thereby carries the slidable plate 52 to key-locking position against the tension of springs 57. When the coils 59 are de-energized, the tensioned springs 57 pull the plate 52 back to inoperative position against stops 56.

The slidable plate 52 locks not only the automatic tuning keys 14, but also the dialing key 18 which is used for tuning in any station. For this purpose one end of plate 52 is provided with a right-angled extension or finger 64, which projects through a slot 65 in partition 27, as shown in Fig. 2. The narrow slot 65 of key 18 (see Fig. 8) is normally in line with the locking extension 64. Therefore, when the slide 52 is actuated by the electromagnet 59, the finger 64 enters slot 65 and locks the key 18 in normal position. The other slot 65 in key 18 is wider than the slots 54 in the automatic tuning keys 14 to permit a partial return movement of the actuated key 18 after the plate 52 has been moved to locking position. The reason for this partial return of key 18 will be understood when I explain the circuit diagrams of Figs. 15—15a. The key 18 controls a pair of switch members 66 and 67 mounted in an insulated block 68 carried by the end piece 25 of the control box. The switch members 66 and 67 are preferably flat spring blades of good conducting metal inserted tightly in slots in block 68 and held in place by an insulating pin 69 or otherwise. The inner end of key 18 may have an eccentric projection 70 for engaging the spring arm 66 at or near its free end. An insulating post or projection 71, which may be integral with the bottom plate 22, carries a contact 72 arranged to be engaged by the spring arm 67 when the key 18 is fully pushed in. The fixed contact 72 also acts as a stop for the inward movement of key 18.

Fig. 8a shows the dialing key 18 locked against return movement by the locking finger 64 engaging the bottom of slot 65, but the key is free for further inward movement because of the depth of slot 65. Therefore, as the key is pushed farther in, the switch arm 67 engages the fixed contact 72 to close the circuit of a small electric motor that operates the tuning shaft of the radio receiver, as will later be explained. When key 18 is released, it returns only partway to normal position, as shown in Fig. 8a, since the locking finger 64 is still held in slot 65. This partial return movement of key 18 is sufficient to open the switch 67—72 so that the motor circuit is interrupted and the tuning shaft stops.

Referring to Fig. 6, a solenoid coil 73 mounted on the bottom plate 22 has a reciprocable magnetic core 74 which terminates in (or otherwise carries) a stop pin 75. A coil spring 76 normally pushes the core 74 toward the key-locking plate 52, which has an extension 77 arranged to overlie the solenoid coil 74, as will be clear from Fig. 2. When the slide 52 is moved to key-locking position by electromagnet 59, the edge 78 of extension 77 moves past the locking pin 75, whereupon the latter is thrown up by spring 76 and prevents return of slide 52 to normal position, even after the electromagnet 59 is deenergized. To release the plate 52 from locking position, it is necessary to energize the solenoid 73 and that is done by the release key 19, to which I referred in a general way in connection with Fig. 1. The inner end of key 19 (see Fig. 7) engages a switch arm 79, which may be a flat spring blade attached to the end wall 25 of the box by screws 80 or otherwise. An insulating post 81 on base 22 carries a contact 82 arranged to be engaged by the spring arm 79 when key 19 is pushed in. The fixed contact 82 also acts as a stop for the inward movement of the key, which is supported in normal position by the spring arm 79. When the switch 79—82 is closed, the solenoid 73 is energized to pull the pin 75 out of contact with slide 52, which is then free to be retracted to normal unlocking position by the tensioned springs 57.

The keys 18 and 19 are slidably mounted in bushings or bosses 83, which may be integral with the removable cover 28. The slot and screw connection 49—50 above described in connection with keys 14 may also be applied to keys 18 and 19, as will be clear from Figs. 7 and 8 without further description. The individual tuning keys 14 may also be mounted on cover 28, like keys 18 and 19. Since the keys 14, 18, and 19 are not connected to their associated switch arms, it is feasible to mount all the keys on the removable cover 28.

Referring to Figs. 2 and 18, the main switch 16 comprises an insulating cam disk 84 pivoted on a stud 85 which is supported in a bushing 86 of the side wall 23. A set-screw 87 carried by cam disk 84 engages in an annular groove 88 in stud 85 to prevent lateral shifting movement of the disk. In describing Fig. 1 I referred to the member 16 as the main switch, but in Fig. 18 the part 16 represents a finger piece attached to cam disk 84 and projecting through a slot 89 in cover 28. A contracting coil spring 90 is attached at one end to a fixed point 91 in the box, and at the other end to a pin 92 projecting laterally from cam disk 84. The spring 90 is always under tension and holds the switch in either position. The cam disk 84 controls a pair of switches, one of which comprises members 93—94 and the other comprises members 95—96. In the present instance, these four switch members are shown as spring arms mounted on a block or projection 97 at one end of the bottom plate 22. The two switch members 94 and 96 may be fixed contacts instead of spring arms. The inherent set or tension of spring arms 93 and 95 is such that normally they are out of contact with the associated switch members 94 and 96. Consequently, when the finger piece 16 is in "off" position, the two switches 93—94 and 95—96 are open. When the finger piece 16 is in "on" position, the cam disk 84 presses the spring arms 93 and 95 against the contacts 94 and 96 respectively, so that the two switches are simultaneously closed. As I shall explain later on, the switch 93—94 controls a relay for operating a main power switch to connect the radio receiver with the house-lighting mains or other source of electric power. The switch 95—96 controls the magnetizing current for the field magnet of the associated loudspeaker S when the latter is of the moving coil type, which requires a strong electromagnetic field.

In describing Fig. 1, I spoke of a signal lamp 20 which automatically lights when a tuning key 14 is operated. Fig. 2 shows the lamp 20 mounted on the bottom plate 22 of the control box between the electromagnetic coils 59. The circuit of this lamp is closed automatically when the slidable plate 52 is moved to key-locking position. For this purpose the armature bar 60 carries an insulating strip 98 which is provided with a contact piece 99 arranged to bridge a pair of insulated contacts 100. These contacts may be spring arms fastened to the bottom plate 22. When the slide 52 is actuated to locking position by the energized electromagnet 59, the insulated contact piece 99 strikes the switch arms 100 and closes the circuit through signal lamp 20. The resiliency of switch arms 100 insures a firm pressure contact with bridge piece 99. When the slide 52 is returned to normal position by operating the release key 19, the switch 99—100 is automatically opened to extinguish the red signal 20.

Each remote control box W is divided into a series of small compartments 101 by cross-plates 102 which are removably inserted between the outer sides 23 and inner partitions 26—27 of the box. A simple way to mount the cross-plates 102 is to insert the two side edges in grooves 103 formed in sides 23 and partitions 26—27. The outer sides 23 and inner partitions 26—27 are provided at their outer ends with shoulders 104 for supporting the windows 15 which I mentioned in the description of Fig. 1. Each row of windows 15 preferably consists of a single strip of ground glass or other translucent material. When the cover 28 is attached to the box, the window strips 15 are automatically secured in place, as will be clear from Fig. 3. The cover 28 has cut-out portions 105, which may be rectangular, circular or of any other outline, and are in alignment with the small compartments 101. Each of these compartments contains a signal lamp 106 mounted in a socket 107, which is secured to the base plate 22. The lamps 106 are arranged opposite the station-selecting keys 14, and the circuit connections (to be subsequently described) are such that when the station selected by an actuated key is in tune, the lamp opposite that key automatically lights. This enables the operator to tell at a distance which station he has tuned in.

The green signal lamp 21, which automatically lights when the power switch 16 is on, may conveniently be mounted in a compartment 108 at one end of the box. The right-hand window strip 15 may extend over lamp 21, but I prefer to cover that lamp with a brightly colored lens to distinguish it from the station-indicating lamps 106. The volume-control knob 17 (see Figs. 2 and 6) is connected to the outer end of a rotary shaft 109 which carries a contact arm 110 arranged to move over an insulated resistance element 112 mounted on the bottom plate 22 of the box. The rheostat 110—112 is so connected with the associated loudspeaker as to vary the volume of reproduction when the knob 17 is turned one way or the other. In the broad aspect of my invention, the rheostat 110—112 may be connected to the radio receiver in any practical way, but in Fig. 16 I have shown a novel method of volume-control which I shall describe later on.

The key-locking slide 52 of each control box carries at one end an insulating block or plate 113 on which a contact arm 114 is mounted. A second contact arm 115 is supported on base 22 so as to be engaged by arm 114 when the slide 52 is actuated to key-locking position. The switches 114—115 of the various control units are so connected in circuit that the closing of any switch automatically energizes the electromagnets 59 of all control units, so that all tuning keys are locked when a tuning key on any panel has been operated. To avoid confusion in the drawings, I have purposely omitted all wiring in Figs. 2, 3, and 6, and I need only say that all the wires leading into the control box are contained in a cable 116, which is supposed to connect to the main cable 10. If the control units Q are built permanently into the walls of the different rooms where they are located, there is no need of having a single cable 116 leading from each box, because the wiring would be concealed anyway and could be arranged in the most convenient way.

I shall now describe the tuning mechanism set in operation in the radio receiver by the remote control units Q. Referring to Figs. 9, 10, and 11, in which some parts are shown for clearness in exaggerated dimensions, the rotary tuning shaft 117 of the receiver has a plurality of disks 118 rigidly mounted thereon. The tuning elements controlled by shaft 117 are indicated by a condenser assembly 119, which may be regarded as representing the several gangs of variable condensers with which modern radio receivers are provided. It is not necessary that the condensers 119 are mounted directly on shaft 117, for they can be mounted on one or more countershafts operatively connected with the main shaft 117. When, therefore, I refer to shaft 117 as the tuning shaft, I do not necessarily mean a shaft carrying the tuning elements, but I include any shaft operable for tuning purposes. There are as many disks 118 as there are automatic tuning buttons 14 on the remote control units Q. In the present example of my invention, there would be ten disks 118 on shaft 117, but in Fig. 9 I show only three disks to avoid unnecessary duplication of parts. It will therefore be understood that each disk 118 represents a certain station, and these stations are the same as those represented by the automatic tuning keys 14 on the remote control units. The disks 118 may be stamped, molded or cast of metal or insulating material, such as aluminum, bakelite, fiber, porcelain, glass and other suitable substances.

The tuning disks 118 are each provided with a notch or recess 120 which cooperates with an associated switch mechanism for automatically stopping the shaft 117 in tuning position for the station represented by that particular disk. This switch mechanism comprises three insulated switches represented by three pairs of contacts 121—122, 123—124, and 125—126. The switch members 121—122 are mounted on a right-angled bracket 127, and the other four switch members 123—126 are attached to a block or bar 128. The parts 127 and 128 are of suitable insulating material, such as bakelite, and are rigidly connected by screws 129 or otherwise to form a unitary support for all the switch assemblies associated with disks 118. By making the parts 127 and 128 separate, it is easy to attach the various switch members thereto. The switch member 121 is a spring arm secured at one end to bracket 127 by one or more screws 130. The switch members 123 to 126 are spring arms attached in proper position to the insulating block 128 by screws 131 or otherwise. Any other practical mounting for the switch assembly 121—126 may be employed. The spring arms 121 and 123 are mechanically connected by an insulating pin 132. The free end of spring arm 123 carries an insulating pin 133, which normally holds the spring arm 125 pressed firmly against the coacting spring arm 126. The normal tendency of spring arm 125 is to remain out of engagement with switch member 126, as shown in Fig. 11. The switch arm 121 carries a projection 134 adapted to enter the notch 120 of the associated disk 118 when the arm is pressed down. The notch 120 and projection 134 are preferably bevelled or tapered to provide a close fit between them so that the disk 118 always stops in exact tuning position.

The notches 120 of disks 118 are in such radial position that each disk tunes in a predetermined station when the projection 134 of the associated arm enters the notch of the disk. After each disk has been adjusted to correct radial position, it is secured to shaft 117 in any practical way, as by a set screw 117' passing through the hub 118' of the disk. An easy way to set each disk is to mount it loose on shaft 117 and hold the projection 134 of spring arm 121 in slot 120. The shaft 117 is then turned by hand to tune in the station for which that particular disk is intended. The disk is then connected to the shaft by tightening the screw 117' or otherwise. This also makes it a simple matter for the owner of the receiver to readjust any disk for any other station. Manifestly, a change of that kind requires that the call letters or other insignia of the new station be placed on the proper window of each remote control panel. As a rule, however, the disks 118 will not have to be adjusted after the set leaves the manufacturer.

The resilient switch arms 121 are individually controlled by a series of electromagnets 135, which are shown in the form of solenoids having each a magnetic plunger 136 connected to one end of a bellcrank 137 pivoted on a rod 138. The electromagnetic coils may conveniently be supported on a common insulating bar 139 which carries a pair of brackets 140 for supporting the rod 138. The bellcranks 137, which may be stamped from sheet aluminum, are held against axial movement on rod 138 by spaced collars 141 or otherwise. The free end of each bellcrank 137 carries a cross-pin or lateral projection 142 arranged normally to rest on the free end of the adjacent switch arm 121, as illustrated in Fig. 10. The inherent tension of spring arm 121 normally holds the bellcrank 137 in raised position, so that the connected solenoid core 136 is partly withdrawn from coil 135. In the normal position of spring arm 121, the tip of projection 134 just misses the periphery of disk 118 or touches it very lightly without engaging the sides of notch 120. When the coil is energized, the core 136 is pulled in and the bellcrank 137 is rocked to position 137', so that the free end of spring arm 121 is bent down as roughly indicated by the dotted outline 121' in Fig. 10. This flexing of spring arm 121 presses the projection 134 against the periphery of the disk 118, but the switch 121—122 remains open and switches 123—124 and 125—126 stay closed. The spring arms 124 and 126 are normally so set that they bend down at their free ends, as will be clear from Fig. 11. Consequently, the slight downward movement of spring arms 123 and 125 when the bellcrank 137 flexes the free end of spring arm 121 is followed up by spring arms 124 and 126 to hold the switches closed.

The pressure of projection 134 on the periphery of disk 118 when coil 135 is energized does not interfere with the rotation of shaft 117. If desired, the periphery of disk 118 and the tip of projection 134 may consist of (or be covered with) anti-friction material, but as a rule that will not be necessary, because the pressure between those parts can be made comparatively light. As soon as the notch 120 of the rotating disk 118 comes in line with projection 134 of the flexed switch arm 121, the latter snaps into the position shown in Fig. 11, whereby the two switches 123—124 and 125—126 are opened and at the same time switch 121—122 is closed. The parts remain in this position as long as the circuit of coil 135 is closed. When the coil 135 is de-energized, the connected spring arms 121 and 123 automatically move back to normal position, carrying the bellcrank 137 along to withdraw the solenoid core 136 from the coil. The return of the switches to normal position does not affect the tuning shaft 117, which remains in tuning position for the station selected by the actuated key 14 on one of the remote control units Q. The function of the switch assembly associated with each tuning disk 18 will be explained in connection with the circuit diagram of Figs. 15—15a.

Referring now to Figs. 12, 13, and 14, the tuning shaft 117 of the radio receiver is operated by a small electric motor 143. The motor shaft 144 carries a worm or spiral pinion 145 arranged in permanent mesh with a gear 146 fixed on shaft 117. The gear connection 145—146 is such that the tuning shaft 117 runs at the required low speed. The tuning dials of modern radio receivers extend through an arc of 180 degrees, because the capacity of the tuning condensers is adjusted from minimum to maximum by a half revolution of the tuning shaft. For this reason it is necessary to reverse the movement of shaft 117 at the end of each half revolution, and this may be done either by reversing the motor shaft 144 or interposing a mechanical reversing connection between the two shafts 117 and 144. In the present instance I have assumed that motor 143 is reversible, and I have therefore shown an automatic reversing switch controlled by gear wheel 146. A frame or bracket 147 mounted adjacent the gear wheel 146 carries a pivot pin or stud 148 on which two members 149 and 150 are mounted for independent movement. In the present instance, the member 149 is connected to pin 148 and member 150 is loose thereon. The pivoted member 149 has two pairs of lateral extensions 151—152 and 153—154, while the other member 150 has two lateral extensions or wings 155 and 156. A contracting coil spring 157 is connected at one end to a pin 158 on member 150, and at the other end to a pin 159 on member 149. The frame or bracket 147, which is preferably of insulating material, carries four pairs of switch arms marked 160—160', 161—161', 162—162' and 163—163'. These switch arms may simply be flat spring blades of good conducting metal mounted at one end firmly in slots 164 of frame 147. The normal tendency of the spring arms of each pair is to remain open.

Still referring to Figs. 12, 13, and 14, the gear wheel 146 on tuning shaft 117 carries a lateral pin 165 arranged to engage the outer ends of cross-arms 155 and 156 of member 150. The two pivoted members 149 and 150 constitute a toggle adapted to operate with a sudden snap action through the tensioned coil spring 157. The rocking movements of member 150 are limited by shoulders 166 and 167 at the upper end of frame 147, as best shown in Fig. 12. When the spring 157 is to the right of pivot 148, the two toggle members 149 and 150 are in the position shown in Fig. 12, and the switches 160—160' and 161—161' are held closed by the lateral extensions 151 and 153 of member 149. It is assumed in this figure that the position of pin 165 corresponds with one end of the tuning dial associated with shaft 117. I have not considered it necessary to shown such a dial, because every radio receiver has one and its function is well understood. Let us suppose that the toggle members 149 and 150 in Fig. 12 have just been operated to close the two switches 160—160' and 161—161', which occurs when the pin 165 on gear wheel 146 is at the end of a half revolution. The closing of those switches automatically reverses the current flow through the motor windings, so that the gear wheel 146 now turns in the direction or arrow 168.

When the pin 165 of gear wheel 146 encounters the cross-arm 156 of toggle member 150, the latter is slowly rocked counterclockwise (as viewed in Fig. 12) and carries with it the upper end of spring 157. The lower toggle member 149 remains in position to hold the switches 160—160' and 161—161' closed until the axis of spring 157 crosses the pivot point 148, whereupon the toggle member 149 is quickly snapped to the left to close the reversing switches 162—162' and 163—163'. When that happens, the pin 165 has reached a diametrically opposite position 165' and the motor shaft 144 is reversed to rotate the gear wheel 146 in the direction of arrow 169. The operation of toggle member 149 with a snap action causes the opening of one pair of switches and the closing of the other pair of switches to take place almost simultaneously, so that the reversal of motor shaft 144 occurs at the right moment—that is, when the tuning dial is at either end of the scale. Another practical advantage of operating the reversing switch with a snap action by the toggle member 149 is that the momentum of the motor shaft 144 is checked at the instant of reversal. Since the motor 143 has only a small fraction of a horsepower and takes little current to run it, there is no danger of burning out the motor windings by the instantaneous reversal of current.

The electrical connections between the motor windings and the reversing switch mechanism are diagrammatically indicated in Fig. 17. The positive and negative leads 170 and 171 are supposed to be connected to the opposite sides of a direct current generator. The armature winding 172 of motor 143 is connected to the feed wires 170 and 171 through brushes 173 and commutator 174. The field winding 175 is diagrammatically represented by a pair of coils connected in series. One end of the field winding is connected by a conductor 176 to switch arms 160 and 163 in parallel, and the other end of that winding is connected by a conductor 177 to switch arms 161' and 162. The switch arms 160' and 162' are connected by branch wires 178 and 179 to the positive lead 170, and a conductor 180 connects the switch arms 161 and 163' in parallel to the negative lead 171. When the two switches 160—160' and 161—161' are closed by the snap-over toggle member 149, as illustrated in Fig. 12, the magnetizing current flows through the field winding 175 in the direction of arrows 181 as follows: From positive lead 170 through conductor 178, across the closed switch contacts 160'—160, conductor 176, through field winding 175 in the direction of arrows 181, conductor 177, closed switch contacts 161'—161, and through wire 180 to the return lead 171. When the snap-over member 149 closes the two switches 162—162' and 163—163', the magnetizing current is reversed through the field windings as follows: From positive lead 170 through conductor 179, across the closed switch contacts 162'—162, conductor 177, through motor winding 175 in the direction of arrows 182, conductor 176, across the closed switch contacts 163—163', and through conductor 180 to the return lead 171. The reversal of current through the shunt field winding reverses the rotation of motor shaft 144 and tuning shaft 117.

We are now ready for the circuit diagram of Figs. 15—15a, which show the operative connections between the remote control units Q and the tuning mechanism of the radio receiver. These two figures are really two halves of a circuit diagram severed along the dash-dot line 183. This separation was necessary because it was impossible to show all the wiring on a single sheet. To avoid needless duplication of circuits I have included only five stations A-E and three control units in the circuit diagram. Any number of stations and control units may be connected in the manner illustrated in Figs. 15—15a. The tuning disks 118, which are mounted side-by-side on shaft 117, are shown separated in face view in Fig. 15, and the dotted line 117 is supposed to indicate diagrammatically the shaft on which the disks are mounted. The automatic reversing mechanism between the electric motor 143 and the tuning shaft 117 is indicated in Fig. 15 by the rectangular outline 184, which may represent an electric reversing switch as previously described, or mechanical reversing connections. The bellcrank connections between the switch arms 121 and the controlling coils 135 are omitted in Fig. 15 to simplify the drawing. In Fig. 15a the five switch arms 38-42 controlled by each automatic tuning key 14 are re-arranged and spread out to make room for the circuit wires. Certain parts in Figs. 15 and 15a are indicated by the suffix letters A-E after the reference numerals to facilitate the tracing of circuits for the different stations. The heavy lines 185 and 186 represent a source of direct current, which may be a battery or the house-lighting circuit. If the latter is alternating current, a rectifier 187 is inserted between the connecting plug 188 and the direct current mains 185—186, which also supply the requisite power to the radio receiver. As a starting point for the tracing of circuits, I have assumed that the conductor 185 is the positive main.

In Fig. 15, two branch conductors 189 and 190 lead from the feed mains 185 and 186. The red signal lamps 29 of the control units are connected in parallel to conductors 189 and 190. Wires 191, 192 and 193 lead from conductor 189 to one side of the signal lamps 29 in control units Q—I, Q—II and Q—III, respectively. The other side of each lamp is connected by wire 194 to one of the associated switch contacts 100. The other switch contact 100 in each unit is connected to conductor 190, these last-named connections being indicated by wires 195, 196 and 197 for the first three units. When the key-locking slide 52 of a unit is actuated, the circuit of the associated signal lamp 29 is closed through switch 99—100. A resistance 198 may be inserted in conductor 190 to cut down the voltage through lamps 29 to the required amount. The switch arms 39 and 41 in each control unit are connected to a common conductor, which is marked 199 in unit Q—I, 200 in unit Q—II and 201 in unit Q—III. These three conductors are joined in parallel to the positive branch line 189.

The switch arms 40 associated with keys 14A-14E of unit Q—I are connected by wires 202-206 to conductors 207-211, respectively. The switch arms 40 for keys 14A-14E of unit Q—II are connected to conductors 207-211 by wires 212-216, respectively, and the switch arms 40 of keys 14A-14E in unit Q—III are connected to conductors 207-211 by wires 217-221 respectively. The individual station-indicating lamps 106 in unit Q—I for stations A-E are connected at one side by wires 222-226 to conductors 227-231 respectively. Similarly, the station-indicating lamps 106 of units Q—II and Q—III for stations A-E are connected at one side to conductors 227-231 by ten wires marked consecutively 232-241. In other words, corresponding lamps 106 in the different units are connected in parallel to the same conductor. The station lamps 106 are connected at the other side to a common conductor 242 through parallel branches 243, 244, and 245 for the first three units represented in Fig. 15a. The station lamps for additional units would be connected in the same way. It will be noticed that conductors 199, 200, and 201 are connected in parallel between conductors 189 and 242.

There are five conductors marked 246-250 (near the top of Fig. 15) to which the five station selecting keys 14A-14E of unit Q—I are connected by wires 251-255 respectively. The selecting keys 14A-14E of unit Q—II are connected to conductors 246-250 by wires 256-260, respectively, and the selecting keys 14A-14E of unit Q—III are connected to conductors 246-250 by wires 261-265 respectively. It is seen from this that corresponding keys 14 of the various control units are connected in parallel to one of the conductors 246-250. The other five automatic tuning keys for stations F-K would be similarly connected to five other conductors. The switch arms 42 of unit Q—I are connected in parallel to a wire 266 which is connected to a conductor 267. The switch arms 42 of control unit Q—II are joined in parallel by a wire 268 connected to a conductor 269. In unit Q—III, the switch arms 42 are connected in parallel by a wire 270 to a conductor 271. One end of each conductor 267, 269, and 271 is connected to the associated tuning key 18, and the other end of the conductor is connected to one side of the electromagnetic winding 59 which controls the key-locking slide 52. In Fig. 15a the winding 59 in each unit is indicated diagrammatically as two coils connected in series, but for convenience we shall consider them as a single coil or winding. The conductor 272 (near the bottom of Fig. 15) is connected in parallel to the other side of coils 59 by wires 273, 274, and 275, respectively. A wire 276 (near the middle of Fig. 15a) is joined to conductors 267, 269, and 271, to which the switch contacts 115 are connected. The switch arms 114 carried by the slides 52 are connected in parallel to conductor 242.

The common contact bar 48 mounted in each control box below (or behind) the movable switch arms 42 is represented in Fig. 15a as a conductor connected at one end to conductor 242 and at the other end to conductor 277. In other words, the common contact bars 48 of the various control units are connected in parallel between conductors 242 and 277. Conductor 277 also acts as a common connection for branch wires 278, 279, and 280 that lead to one side of the associated releasing coils 73. The other side of each coil 73 is connected to the stationary contact 82 in the control unit. The switch arms 67 of the control units are connected in parallel to conductor 277 by wires 281, 282 and 283, which may in practice be merely continuations of wires 278, 279, and 280 respectively. The stationary contacts 72 of the control units are connected in parallel by wires 285, 286, and 287 to a conductor 284 which leads to one side of motor 143. The other side of the motor is connected to conductor 288 which leads to the power main 186. The switch arms 79 (near the bottom of Fig. 15a) are connected in parallel to a common conductor 289 which is connected to power main 186.

The switch arms 121 in the radio receiver (near the top of Fig. 15) are connected in parallel to conductor 288 by branch wires 290-294. The switch arms 123 are connected to conductors 207-211 by wires 295-299, respectively. The switch arms 124 are connected in parallel to conductor 284 by wires 300—304 respectively. The pairs of switch arms 125—126 are connected in series to a conductor 305, which is connected at its ends to conductors 272 and 288. The stationary switch contacts 122 are connected to conductors 227—231 by wires 306—310 respectively. The switch-controlling coils 135 are connected at one side to the individual conductors 246—250 by wires 311—315 respectively. The other side of each coil 135 is connected to a common return conductor 316, which leads to the power main 186.

Let us suppose that we want to bring in station C from unit Q—II. When the tuning key 14C is pushed in, the circuit of coil 135C is closed through the following connections: Starting at the main service lead 185, we go through conductors 189 and 200, across switch contacts 38—39 closed by key 14C, wires 258 and 248, wire 313, coil 135C, and through wire 316 to the return main 186. The energized coil 135C pulls down the free end of the adjacent spring arm 121 (see Fig. 10), but without affecting the associated switch assembly. The purpose of energizing coil 135C is to place the spring arm 121 in condition to snap into operative position when the notch 120 of disk 118C registers with the projection 134 on arm 121. The operation of key 14C closes the circuit of electric motor 143 as follows: Main lead 185, conductors 189 and 200, switch contacts 40—41 closed by key 14C, through wire 214 to wire 209, through wire 297, closed switch 123—124, conductor 284, through the windings of motor 143, and through conductor 288 to the return main 186. The motor now rotates the tuning shaft 117 until the notch 120 of disk 118C comes into alignment with projection 134 on the tensioned spring arm 121, whereupon the associated switch assembly moves into the position shown in Fig. 11. That is to say, the switch 121—122 is closed and switches 123—124 and 125—126 are opened. The opening of switch 123—124 breaks the motor circuit and instantly stops rotation of the tuning shaft, so that the selected station C remains in tune.

When the tuning key 14C of unit Q—II is pushed in, the slidable plates 52 in all control units are instantly moved to key-locking position by the energization of electromagnets 59. For the magnet coil 59 of unit Q—II, the circuit is closed as follows when key 14C is operated: Service lead 185, conductors 189 and 200, wire 242, common contact bar 48 which is now engaged by the associated switch arm 42, wires 268 and 269, through coil 59, wires 274 and 272, through conductor 305 and the closed switches 125—126 in series, and through conductor 288 to the return main 186. The energized coil 59 of unit Q—II moves the slide 52 to key-locking position, as previously explained, and at the same time closes the switch contacts 114—115. The closing of this switch completes the circuits through coils 59 of all other control units. From conductor 242 the current now passes through closed switch 114—115 of unit Q—II to conductor 276, which forms a common connection between conductors 267, 269 and 271. Therefore, current flows through conductor 267, coil 59 of unit Q—I, wire 273, common conductor 272, and through the return conductor 305 as above described. Also, from conductor 276 the circuit of coil 59 in unit Q—III is completed through wires 271, 275, 272, and 305. The operation of slides 52 to locking position automatically closes the associated switches 99—100, so that the red signal lamps 20 are lighted on all panels as a warning that somebody is tuning the radio receiver.

When station C is in tune, that fact is automatically indicated on every panel by the lighting of lamp 106C. As heretofore mentioned, when the projection 134 of the tensioned spring arm 121 snaps into notch 120 of the associated disk 118C, switch 121—122 is closed, and this closes the circuit of lamp 106C of unit Q—II through the following connections: From main line 185 through conductors 189, 200, 242, and 244, through lamp 106C and wire 234 to conductor 229, through wire 308 to closed switch 121—122, wire 292, and through conductor 288 to the return lead 186. If desired, a resistance 317 may be inserted in conductor 288 to reduce the voltage for lamps 106. The corresponding station-indicating lamps 106C on all the other panels are automatically lighted when the selected station is in tune. The circuit of lamp 106C in unit Q—I is closed through conductors 189, 199, 242 and 243, through lamp 106C and wire 224 to common conductor 229, and from there through the closed switch 121—122 of disk 118C to the return main 186 as above described. The circuit of lamp 106C in unit Q—III is closed through conductors 189, 201, 242, and 245, through lamp 106C, wire 239, common conductor 229, and from there as previously described for lamp 106C in unit Q—II. The lighting of lamps 106C on all the panels informs the occupants of the rooms which particular station is in tune, so that anyone may receive the broadcast program through the loudspeaker S by simply closing the main switch 16 of his panel. It should be noted that the individual station-indicating lamps 106 remain lighted as long as the selected station is in tune.

The circuits of coils 59 which actuate the key-locking slides 52 are closed through the series switches 125—126 in conductor 305, as above explained. Therefore, when any one of these switches is open the coils 59 in all control boxes are de-energized, and this happens as soon as the selected station is in tune. The actuated slides 52, however, do not return to normal position because they are held in key-locking position by the pins or projections 75 of electromagnets 73. Consequently, to release the slides 52 it is necessary to energize one of the coils 73 by depressing the associated release key 19. Let us assume that the operator of unit Q—I, whose tuning keys were automatically locked on the operation of key 14C in unit Q—II, wants to bring in a station of his own selection. The first thing he does is to operate key 19 which closes the circuit of coil 73 through the following connections: power main 185, conductors 189 and 199 to common conductor 242, wires 48 and 278, coil 73, closed contacts 82—79, and through conductor 289 to the return lead 186. When the energized coil 73 pulls the locking pin 75 away from slide 52, the latter is instantly restored to normal unlocking position by springs 57. The tuning keys 14 and 18 on panel Q—I are now free for operation. The actuation of any release key 19 energizes the coils 59 of all control units through a common connection 318 between the switch contacts 82. In the example above given, where the operator of unit Q—I pushes the release key 19, the release of slide 52 in unit Q—II allows the previously actuated key 14C to return to normal position. This opens all the switch contacts associated with that key, so that coil 135C is de-energized to release the spring arm 121. The return of spring arm 121 to normal position opens switch 121—122 and closes the associated switches 123—124 and 125—126.

It has been assumed that each remote control unit has ten keys 14 for automatically selecting ten different stations. This number of stations is more than will probably be used in any locality. Under the present system of sending all the important broadcast programs through a network of stations from coast to coast, a person will seldom need more than five or six stations for all the worth-while programs that may be received. It may, however, happen that a person wants a station not represented by the automatic tuning keys 14. Or, not knowing which stations are broadcasting, a person might find it too bothersome to operate each key 14 until he gets what he wants. To enable the operator to dial the receiver for a suitable program, is the function of the dialing key 18, which operates the tuning shaft of the receiver from one end of the dial to the other until the key is released. Turning to the circuit diagrams of Figs. 15—15a, if the dialing key 18 of unit Q—I is pushed in, the circuit of motor 143 is closed as follows: From the common conductor 242, which is connected to the branch conductor 189, we go through wire 48 to conductor 277, through closed switch 67—72, wire 285, conductor 284, through windings of motor 143, and through connection 286 to the return lead 186. The motor circuit is similarly closed when any one of the other dialing keys 18 is pushed in. The motor 143 rotates the tuning shaft 117 at the required low speed, so that the operator can hear the kind of program that is coming across as each station reaches tuning position. When the operator gets the desired broadcast, he simply releases key 18 and the motor stops, leaving the desired station in tune. The electromagnets 135 remain de-energized during this dialing operation, so that the disks 118 on shaft 117 are free to rotate without interference by the associated spring arms 121.

When the dialing key 18 of unit Q—I is pushed in, the switch contacts 66 and 67 are closed, whereby the coils 59 of all control units are energized to move the slides 52 to key-locking position and at the same time light the red signal lamps 20, as heretofore explained. It is necessary that the dialing keys 18 should have sufficient movement to open the motor switch 67—72 when the actuated key is released. This required movement of key 18 is made possible by the wide slot 65, as previously described in connection with Figs. 8 and 8a. When the slides 52 in the remote control units are moved to locking position, they also lock the dialing keys 18 in normal position, because the arm or extension 64 of each slide enters the slot 55 of the associated key 18. This was fully explained in the description of Figs. 8 and 8a. However, when a dialing key 18 is pushed in, the extension 64 of slide 52 enters the wide slot 65 of the key, so that the latter is free to return part way to normal position, whereby the motor switch 67—72 is opened to stop the tuning shaft instantly upon release of the key. The dialing keys 18 of all the other panels remain locked against operation until a releasing key 19 is pushed in.

In the wiring diagram of Fig. 16, the two pairs of switch contacts 93—94 and 95—96 operated by the finger piece 16 are spaced laterally to facilitate the showing of circuits. The switches 93—94 are connected in parallel to conductors 319 and 320, which lead from the service mains 186 and 185 respectively. The conductor 320 contains a coil 321 of an electromagnetic relay 322, and a resistance 323 may be included to cut down the voltage through the coil. An armature 324 is pivoted at 325 to the magnetic frame of the relay, and the free end of the armature is in operative relation to a movable switch arm 326, which may be a spring blade mounted at one end. A wire 327 connects the switch arm 326 to service main 186, and a contact 328 associated with arm 326 is connected with conductor 319 by a wire 329. The normal set or tension of spring arm 326 holds it away from contact 328. A small contracting coil spring 330 normally holds the pivoted armature 324 against a fixed stop 331. When the coil 321 is energized by the closing of any one of the switches 93—94, the armature 324 is rocked toward the magnetic frame of the relay and forces the switch arm 326 against the associated contact 328. This closes the power circuit 185—186 for radio receiver R and all apparatus connected therewith. In other words, the parts 326—328 constitute a main power switch adapted to be controlled from any unit Q by means of the movable finger piece 16. The main switch indicated diagrammatically by the movable member 332 is embodied in the cabinet of receiver R and may be assumed to be operated by knob 333 on the front panel of the cabinet. Since the two main switches 326—328 and 332 are in parallel, they are independently operable to open and close the power circuit 185—186. The relay coil 321 operates at such low voltage that no arcing occurs at the switch contacts 93—94. In Fig. 16 the main switch 326—328 is shown closed, because the relay coil 321 is energized through the closing of switch 93—94 on panel Q—I.

I mentioned in connection with Fig. 1 that the signal lamp 21 in each control unit is automatically lighted when the main switch 16 is thrown on. This will be clear from Fig. 16 where it is seen that the circuit of relay coil 321 is closed through any one of the signal lamps 21, which are connected in parallel between conductors 319 and 320. One terminal of each lamp is connected to the associated switch arm 93 by a wire 334. The other terminal of each lamp is connected by a wire 335 to conductor 319. It may be advisable to shunt a resistance 336 across each lamp 21 to insure the operation of relay coil 321 even if a lamp should happen to burn out. As stated before, the lamps 21 may shine through a bright green lens to indicate vividly that the radio receiver R and loudspeakers S are connected to the power circuit. The loudspeakers S in Fig. 16 are supposed to be of the moving coil type and the vibratory speech coils are indicated diagrammatically by the dotted circles 337. The speech coil 337 of loudspeaker S of control unit Q—I is connected by conductors 338 to a secondary coil 339. Similarly, the speech coils 337 of the other two loudspeakers S are connected by conductors 340 and 341 to secondary coils 342 and 343 respectively. The three secondary coils 339, 342, and 343 are inductively related to a common primary coil 344 of an output transformer indicated as a whole by 345. It is assumed that the primary coil 344 is properly connected to the output terminals of radio receiver R. The circuit of each loudspeaker coil 337 contains the rheostat 110—112, which is here in series with the coil, but it might also be connected in shunt thereto. By adjusting the rheostat arm 110, the resistance of the speech circuit is varied and the volume of reproduction is regulated accordingly.

Still referring to Fig. 16, the field coils of loudspeakers S are connected in parallel to a pair of leads 346 and 347, which are connected to the power supply line to furnish a substantially constant current of the required voltage, as will be understood without further explanation. The terminals 348 of loudspeakers S are connected in parallel to conductor 346, and the other terminals 349 are connected in parallel to switch arms 95 by wires 350. The switch contacts 96 are connected in parallel to conductor 347 by wires 351. When the finger piece 18 on the control panel is in "off" position, the associated switch 95—96 is open, so that no current passes through the field coil of the connected loudspeaker. The closing of the main switch 326—328 is always accompanied by the closing of the associated loudspeaker switch 95—96, so that no separate operation is required for placing the loudspeaker in operative condition. When electric impulses pass through the primary output coil 344, similar impulses are induced simultaneously in the secondary coils 339, 342, and 343. However, the energization of the vibratory speech coils 337 does not render the loudspeakers operative unless the main switch 16 of a unit is closed to energize the field coil of the connected loudspeaker. Instead of having a single primary coil 344 for all secondary coils, it is evident that each secondary coil may have its own primary coil. Although Fig. 16 shows the circuit connections for three loudspeakers only, it will be readily understood how additional loudspeakers can be connected to their respective control panels. The relative turns in primary coil or coils 344 and the associated secondary coils can readily be determined by the builder to produce the best results with any particular type of loudspeaker. Some loudspeakers are capable of carrying more power than others. If the radio receiver R has a loudspeaker of its own, its volume may be controlled in the usual way by a rotary hand knob 352. A knob 352' may be provided for tuning the receiver by hand in the usual way, although that is not necessary where the remote control alone is intended to be used.

Fig. 22 illustrates diagrammatically a modified circuit arrangement by which the dialing keys 18 are not locked in actuated position. It will be recalled that in the system of Figs. 15-15a, the operation of any dialing key 18 automatically energizes the coils 59 of all units to move the slides 52 to key-locking position. In the modification of Fig. 22 the circuit arrangements are such that, when the dialing key 18 of a unit is actuated, the slide 52 of that unit is not moved to locking position, but the slides of all the other units are actuated to lock all the tuning keys. Fig. 22 shows only the circuit connections below the common conductor 242, because everything above that conductor is supposed to be the same as in Fig. 15a. To avoid needless repetition of description, I have indicated similar parts in Figs. 15a and 22 by the same reference numerals. In Fig. 22 each dialing key 18 operates four switch arms 353, 354, 355, and 356. The switch arms 354 and 356 are mechanically connected by an insulating pin 357 which may be secured to either arm. These switch arms may be in the form of flat spring blades mounted at one end in an insulating block 358 (see Fig. 23) attached to a wall of the control box. The arrangement of the switch arms is such that the arms 353 and 355 are normally out of contact with arm 354, but the switch arm 356 normally engages a contact piece 359 carried by an insulating block 359' which may be attached to one of the transverse partitions 102. When the key 18 is pushed in, the switch arm 353 is first moved into contact with arm 354, which first moves the switch arm 356 away from contact 359 and then engages the adjacent arm 355. The point to remember is that the switch 356—359 is opened before the switch 345—355 is closed. The reason for this will presently be explained. A fixed stop 356' on the bottom 22 of the control box engages the arm 356 for limiting the inward movement of key 18.

Referring to Fig. 22, the switch contacts 353 are connected in parallel to conductor 284 by wires 360, and the switch arms 354 are connected in parallel to conductor 277 by wires 361. The switch arms 355 are connected in parallel to a common conductor 362 by wires 363 to which the switch arms 356 are also connected. Let us say that the dialing key 18 of control unit Q—I has been pushed in. The circuit through electric motor 143 (see Fig. 15) is closed through wire 48 (which is connected to service lead 185 of Fig. 15, as previously explained) to connecting point 364, wire 361, across the closed switch contacts 354—353, wire 360, and through conductor 284 which is connected to one terminal of the motor windings. The closing of switch 354—355 on the operation of key 18 closes the circuits of coils 59 in units Q—II and Q—III, but not the circuit of coil 59 in unit Q—I, to which the actuated key 18 belongs.

It was previously mentioned that switch 356—359 is opened before switch 354—355 is closed. The prior opening of switch 356—359 prevents energization of coil 59 in unit Q—I through the closed switch 354—355, so that the slide 52 is not moved to key-locking position and the actuated key 18 is free to return to normal position when released. However, the opening of switch 356—359 does not prevent the energization of coils 59 in units Q—II and Q—III, because the circuits of those coils are completed through the following connections: For coil 59 in unit Q—II, we follow the circuit from the common conductor 242 through wire 48 in unit Q—I, conductor 277 to point 364, wire 361, through closed switch 354—355, wires 365 and 366, through the closed switch 356—359 of unit Q—II, wire 269, through coil 59 of that unit, and back to the return lead as previously explained in connection with Figs. 15—15a. For coil 59 of unit Q—III, the circuit is closed through conductor 365, wire 367, through the closed switch 356—359 of the unit, wire 271, through coil 59, and so on as before. When the dialing key 18 of unit Q—II is operated, the coils 59 of the other units are energized to actuate the key-locking slides 52, but the coil 59 of unit Q—II is not energized so that the actuated key is free to return to normal position upon release. Since the modification in Fig. 22 requires more switches for the dialing keys 18, it is perhaps not so desirable as the dialing circuits of Figs. 15—15a, but it is nevertheless a practical construction and may be preferred by some radio engineers.

In Fig. 19 there is a box or cabinet indicated as a whole by 368, which contains not only the remote control mechanism, but also the loudspeaker S. This cabinet constitutes a combined loudspeaker and remote control device as a unitary structure adapted to be placed anywhere in the room. In Fig. 20 the remote control box Q and loudspeaker S are separate units mounted permanently in the wall 34, the loudspeaker being above the control box. In Fig. 21 the control box and loudspeaker are mounted in a common casing 369, which is set into a wall of the room as a permanent fixture. The loudspeaker S is supported in casing 369 below the control panel. The cone diaphragm of the loudspeaker is open to the outer air through an amplifying chamber 370, which is closed by an ornamental grille or other suitable cover 371.

In a simplified embodiment of my invention, the individual tuning keys 14 may be omitted, so that all tuning is done by operating the dialing keys 18. As a general rule, however, it is desirable to have the automatic tuning keys 14, because the best programs are broadcast by four or five stations throughout the country, and a person need only push a button to bring in the desired station. The tuning buttons 14 need not be held in, so that a person only touches a button momentarily to push it in as far as it will go. Even a child or baby can do this, and the actuated button remains locked to insure tuning of the receiver. In a less complete form of my invention, the key-locking slides 52 may be omitted, but it is better to have them, for they prevent tampering with the keys of other units when a person is tuning in a station from his own unit. If it should happen that two or more keys 14 are simultaneously pushed in, whether by accident or otherwise, no harm is done to the system, but the tuning shaft will stop as soon as the projection 134 on one of the tensioned spring arms 121 snaps into the slot 120 of the associated disk 118. In some types of radio receivers the tuning shaft may be operated by the electric motor 143 in one direction only, so that no automatic reversing mechanism is necessary.

Although I have shown and described certain specific constructions and circuit arrangements, I want it understood that my invention is not limited to the details set forth. Chances and modifications will probably suggest themselves to radio experts without departing from the scope of the invention as defined in the appended claims. When in certain claims I refer to the cover of the remote control box as permanently closed, I simply mean that it need not be opened during the normal manual control of the inside mechanism. As far as I know, I am the first to provide a multiple-unit remote-control system for radio receivers with certain operative connections between the different units, and I claim this idea in a fundamental way. It is evident that all the various features of my invention need not be embodied in a single system, for some features may be used without others.

I claim as my invention:

1. In combination with a radio receiver, a plurality of remote control units operatively connected with said receiver and comprising each a box having a permanently closed cover, each unit having hand-operable means adapted to tune in a desired station, said hand-operable means projecting outside the cover and being capable of operation while said cover remains closed, and means whereby the operation of any unit automatically locks the station-selecting means of the other units against tuning operation.

2. In combination with a radio receiver, a plurality of remote control units operatively connected with said receiver and comprising each a box having a permanently closed cover, each unit having a manually operable key to tune in a desired station, said key projecting beyond the cover and being operable while the cover remains closed, and means whereby the actuation of the key of any unit automatically locks the keys of the other units against operative movement.

3. A radio receiver having a rotary tuning shaft and an electric motor for operating said shaft, in combination with a plurality of remote control units having each a hand-operable switch for closing the motor circuit, each unit comprising a box with a permanently closed cover, said switch having a finger piece projecting through said cover and operable while the cover remains closed, and connections whereby the closing of any one of said switches automatically locks the other switches of all the other units against closing.

4. In combination with a radio receiver, a plurality of remote control units electrically connected with said receiver and individually operable, each unit having a series of keys selectively operable to tune in any one of a plurality of stations, and connections whereby the operation of any key in any unit is automatically signalled to all the other units, said signaling connections including means for identifying the actuated key in all units.

5. In combination with a radio receiver, a plurality of remote control units electrically connected with said receiver and individually operable, each unit having a series of keys selectively operable to tune in any one of a plurality of stations, and connections whereby the operation of any key in any unit automatically locks all the tuning keys of the other units against operation.

6. In combination with a radio receiver, a plurality of remote control units operatively connected with said receiver, said units being individually operable to tune in a desired station, means whereby the operation of any unit automatically locks the other units against tuning operation, and manually controlled means associated with each unit for releasing said locking means to permit operation of the unit.

7. In combination with a radio receiver, a remote control unit operatively connected with said receiver, said unit comprising manually operable means for selecting any station to be tuned in, a main power switch in said unit for connecting the receiver to a source of electric current, a loudspeaker associated with said unit and having a magnetic field coil connected to said source of current, a second switch in said unit for controlling the connection of said field coil with the source of current, and a single finger piece in said unit for simultaneously operating both switches, which remain in either actuated position upon release of the finger piece.

8. In combination with a radio receiver, a plurality of remote control units electrically connected with said receiver and individually operable, each unit having a series of keys selectively operable to tune in any one of a plurality of stations, a signal lamp associated with each key, means whereby the lamp of an actuated key is lighted when the corresponding station is in tune, and connections whereby the corresponding signal lamps in all the other units are lighted to indicate the tuned-in station.

9. In combination with a radio receiver, a plurality of remote control units operatively connected with said receiver, each unit having a power switch and station-selecting mechanism and a pair of signal lamps, means whereby the operation of any power switch lights one of said signal lamps in each unit, and means whereby the operation of said mechanism in any unit automatically lights the other lamps in all units.

10. In combination with a radio receiver, a plurality of remote control units operatively connected with said receiver and individually operable, each unit comprising a series of hand-operable members representing a set of preselected stations, and means whereby the identity of any operated member in any unit is automatically communicated to the other units.

11. In combination with a radio receiver, a plurality of remote control units operatively connected with said receiver, each unit having means for selecting any one of a plurality of stations to be tuned in, a general signal lamp and individual station-indicating lamps in each unit, connections for automatically lighting the general signal lamps in all units when the station-selecting means of any unit is operated, and means for automatically lighting the corresponding station-indicating lamps in all units when the selected station is in tune.

12. In combination with a radio receiver, a plurality of remote control units electrically connected with said receiver, a set of normally open switches mounted in each unit and individually operable, each switch representing a certain station, a normally inoperative signal lamp in each unit, and connections whereby the closing of any switch in any unit automatically lights the signal lamps of all units, said connections including means for causing the lamps to remain lighted when said switch is manually released.

13. In combination with a radio receiver, a plurality of remote control units electrically connected with said receiver, a set of normally open switches mounted in each unit and individually operable, each switch representing a certain station, a normally inoperative signal lamp associated with every switch in each unit, and means whereby the closing of a switch in any unit causes the lamps of the corresponding switches in all units to be lighted when the selected station is in tune, said lamps remaining lighted as long as the receiver is in tune for the selected station.

14. In combination with a radio receiver, a plurality of remote control units operatively connected with said receiver, said units being individually operable to tune in a desired station, means whereby the operation of any unit automatically locks the other units against tuning operation, and signal means in each unit controlled by said locking means.

15. In combination with a radio receiver, a plurality of remote control units operatively connected with said receiver, each unit comprising a box with a permanently closed cover, means whereby each unit is individually operable to tune in a desired station, said tuning means including at least one finger piece which projects out of said cover and is operable while the cover remains closed, means whereby the operation of any unit automatically locks the other units against tuning operation, and a signal lamp in each unit so connected as to light automatically when the unit is locked.

16. In combination with a radio receiver, a plurality of remote control units operatively connected with said receiver, each unit comprising a box with a permanently closed cover, means whereby each unit is individually operable to tune in a desired station, said tuning means including at least one finger piece which projects out of said cover and is operable while the cover remains closed, a loudspeaker connected to each unit, and means whereby the tuning operation of any unit automatically locks the other units against tuning operation, said locking means permitting operation of the loudspeakers of all units.

17. In combination with a radio receiver, a plurality of remote control units operatively connected with said receiver, and comprising each a box with a permanently closed cover, each unit having manually operable means for preselecting a desired station, said manual means projecting out of said cover and being operable while the cover remains closed, means whereby the operation of the station-selecting means of any unit automatically locks the station-selecting means of the other units against operation, and means whereby the operation of said tuning means in any unit is automatically signalled to the other units.

18. The combination of a radio tuning shaft, an electric motor for actuating said shaft to tuning position, a plurality of remotely located devices for controlling the operation of said motor to tune in a desired station, each of said devices comprising a box with a permanently closed cover, and means for automatically disabling all other control devices when any one of them is operatively connected to said motor, said means including a finger piece operable while said cover remains closed.

19. The combination of a radio tuning shaft, an electric motor for actuating said shaft to tuning position, a plurality of remotely located devices for controlling the operation of said motor to tune in a desired station, each of said devices comprising a box with a permanently closed cover, means for automatically disabling all the other control devices when any one of them is operatively connected to said motor, said means including a finger piece operable while said cover remains closed, a loudspeaker associated with each device, and means for connecting any loudspeaker with the radio receiver when a station has been tuned in from any one of said devices.

20. A radio receiver having adjustable tuning elements, an electric motor for adjusting said elements, a plurality of normally closed switches in the motor circuit, each of said normally closed switches representing a certain station, independently operable means associated with each switch for automatically opening said switch when said elements are in predetermined tuning position for a selected station, in combination with a remote control unit operatively connected with said receiver, a plurality of normally open switches in said unit, each of said last named switches being connected in series with one of said normally closed switches, a push button for closing each normally open switch to energize said motor, said push buttons representing the same stations as said normally closed switches, means in said unit for automatically locking any push button in actuated position, and controllable means for releasing a locked button.

21. A radio receiver having adjustable tuning elements, an electric motor for adjusting said elements, a normally closed switch in the motor circuit, a normally open switch, a movable member for controlling both switches, electromagnetic means for actuating said member to open the motor switch and close the second switch when said elements are in tuning position for a selected station, in combination with a remote control device operatively connected with said receiver, a normally open switch in said device connected in series with said normally closed motor switch, a finger piece for closing said normally open switch to energize the motor, and a signal lamp in said device connected to said second switch, whereby said lamp automatically lights when the motor stops.

22. In combination with a radio receiver, a plurality of remote control units operatively connected with said receiver, each unit having a power switch, electric connections whereby said units are individually operable to tune in any desired station, means in each unit for indicating the station tuned in, means independent of said power switches for simultaneously operating all of said station-indicating means, a loudspeaker operatively associated with each unit and remaining inoperative as long as the power switch of that unit is open, and circuit connections whereby the closing of the power switch in any unit after a station has been tuned in by another unit automatically connects the associated loudspeaker to reproduce the tuned-in broadcast.

ADOLPH A. THOMAS.